(12) United States Patent
Altounian et al.

(10) Patent No.: US 8,156,105 B2
(45) Date of Patent: Apr. 10, 2012

(54) RAPID ITEM DATA ENTRY FOR PHYSICAL ITEMS IN THE CONTROL OF A USER IN AN ITEM DATA MANAGEMENT SERVER

(75) Inventors: David Altounian, Austin, TX (US); Charles Zeller, Austin, TX (US); Sara Fox, Austin, TX (US)

(73) Assignee: ITAGGIT, Inc., Austin, TX (US)

( * ) Notice: Subject to any disclaimer, the term of this patent is extended or adjusted under 35 U.S.C. 154(b) by 1337 days.

(21) Appl. No.: 11/500,199

(22) Filed: Aug. 7, 2006

(65) Prior Publication Data

US 2007/0198488 A1    Aug. 23, 2007

Related U.S. Application Data

(63) Continuation-in-part of application No. 11/486,709, filed on Jul. 14, 2006.

(60) Provisional application No. 60/771,135, filed on Feb. 6, 2006, provisional application No. 60/743,733, filed on Mar. 24, 2006, provisional application No. 60/743,735, filed on Mar. 24, 2006, provisional application No. 60/743,734, filed on Mar. 24, 2006, provisional application No. 60/743,737, filed on Mar. 24, 2006, provisional application No. 60/743,736, filed on Mar. 24, 2006.

(51) Int. Cl.
*G06F 7/00* (2006.01)

(52) U.S. Cl. .................... 707/711; 707/741; 715/230

(58) Field of Classification Search ............ 707/795, 707/802, 803, 999.1, 999.101, 999.102, 711, 707/741
See application file for complete search history.

(56) References Cited

U.S. PATENT DOCUMENTS

| | | | |
|---|---|---|---|
| 2006/0161635 A1* | 7/2006 | Lamkin et al. | 709/217 |
| 2007/0056002 A1* | 3/2007 | Ganesan et al. | 725/95 |

* cited by examiner

*Primary Examiner* — Amy Ng
(74) *Attorney, Agent, or Firm* — Garlick & Markison; Kevin L. Smith

(57) ABSTRACT

An item data management server with rapid item data entry to facilitate database population with physical item data records for physical items in the control of a user. The rapid item data entry includes receiving a media file with at least an image and/or a verbal description for a physical item in which the item data management server may create physical item data record.

18 Claims, 29 Drawing Sheets communication system 10 add physical item GUI 200 rapid item import GUI 230 physical item
data record 240 web page 168 navigation bar
202

| search | collections | forums | experts | contacts |

My Collections  collection identifier field 282  collection owner field 284  collection type/ community field 286

| Name: | Owner: | Type: | Items | Valuation |
|---|---|---|---|---|
| Global Collection | iTaggit | | | |
| COLLECTION Z | [me] | Shared – Community A | 777 | $xxx.xx |
| COLLECTION A | user ID | Shared – Community B | 2 | $yyy.yy |
| COLLECTION B | [me] | Private | Private | $zzz.zz |
| COLLECTION C | user ID | Shared – Community C | 55 | $nnn.nn |
| COLLECTION D | user ID | Shared – Community D | 1457 | $ppp.pp |
| COLLECTION E | [me] | Private | Private | $ddd.dd | add new collection   create collection query 292   items field 290   collection valuation field 288

FIG. 9
collection summary
web page 280 navigation bar
202

| search | collections | forums | experts | contacts |

| Research | Sell / Buy | Trade | Forum | Experts | Merchandise | Reports | activity bar 322

DISPLAY: [list ▼]  SHOW: [1-25 ▼]

ACTION: action query 324 — [Select... ▼]  GO move to — collection creation query 326 — [collection... ▼]  GO view by Tag — view query 328 — [... ▼]

| select | item name | category | type | origin | valuation |
|--------|-----------|----------|------|--------|-----------|
| ☐ | Panda Stamp | Stamps | commemorative | U.S. | $6.25 |
| ☐ | Beaver Stamp | Stamps | commemorative | U.S. | $0.39 |
| ☐ | ITEM NAME | - | - | - | - |
| ☐ | ITEM NAME | - | - | - | - |
| ☐ | ITEM NAME | - | - | - | - | item list 330

ACTION:
[Select... ▼]

Select...
View Selected
Remove from Collection
Batch Edit Tags
Delete Items action query 324 move to:
[collection... ▼]

collection...
collection Z
collection A
collection B
collection C
collection D
collection E
create collection collection query 326 view by Tag:
[... ▼]

...
tag 3
tag 4
other...

view query 328

FIG. 10
item view web page 320 navigation bar
202

| search | collections | forums | experts | contacts |

Edit/Create Collection — collection creation query 362 share query 364
[ COLLECTION NAME ] edit

☑ this is a shared collection
*if checked the permissions below would be visible*
*if not then it is considered - by default - a PRIVATE collection ]* community creation query 366

[ COMMUNITY NAME ]

| subscriber | | permissions right to review | right to alter |
|---|---|---|---|
| ☐ hikepuppy | permissions query 368 | ☑ | ☑ |
| ☐ fredf | | ☑ | ☑ |
| ☐ barneyr | | ☑ | ☑ |
| ☐ wilmaf | | ☑ | ☐ |
| ☐ bettyr | subscriber action query 372 | ☑ | ☐ |
| ☐ dinof | | ☑ | ☐ |
| [Add]   [Delete] | | | | subscriber query 370

374 {
☑ Community A [edit]   *check to associate community with Collection*
☐ Community B [edit]   *check to associate community with Collection*
☐ Community C [edit]   *check to associate community with Collection*

| ADD | | CANCEL | | DELETE |

ADD command 376        CANCEL command 378        DELETE collection command 379

FIG. 11
edit/create collection GUI 360 collection reference data structure 400 community reference
data structure 420

```
                    navigation bar
                    202
                      ╲    ┌──────────────────────────────────────────────────────┐
                           │ search    collections    forums    experts   contacts│
                           └──────────────────────────────────────────────────────┘
                      ┌─────────────────────────────────────────────────────────┐
                      │ Research   Sell / Buy   Trade   Forum   Experts   Merchandise   Reports │
                      └─────────────────────────────────────────────────────────┘
                                                                    ╲ activity bar
                           DISPLAY: [list   ▼]   SHOW: [1-25  ▼]      322

ACTION:              move to                view by Tag
      [Select...      ▼]   [collection...    ▼]   [...            ▼]
      [ GO ]               [ GO ]
                                          ╱─442
      ┌────────────────────────────────────────────────────────────┬─────────────┐
      │ COLLECTION Z    ⌐Collection Valuation⌐  [ $nnn.nn      ]   │             │
      │                                                            │             │
      │ select    item name    448   category  sub-category  valuation │         │
      │                        ╱─                                  │             │
      │ ┌─────────────────────────────────────────────────────┐    │ Advertisement│
      │ │ ☑ Panda Stamp      Stamps    commemorative   $6.25  │    │ Link 444    │
      │ └─────────────────────────────────────────────────────┘    │             │
      │ ┌─────────────────────────────────────────────────────┐    │             │
      │ │ ☐ Beaver Stamp     Stamps    commemorative   $0.39  │    │ Other Link 446│
      │ └─────────────────────────────────────────────────────┘    │             │
      │   ╲─450   •              •             •             •     │             │
      │           •              •             •             •     │             │
      │           •              •             •             •     │             │
      │ ┌─────────────────────────────────────────────────────┐    │             │
      │ │ ☐ ITEM NAME         -            -            -     │    │             │
      │ └─────────────────────────────────────────────────────┘    │             │
      │   ╲452   454╲  ⌐ ─ ─ ─ ─ ─ ─ ─ ─ ─ ┐                       │             │
      │              ╲ │  Valuation Total  │  [ $xxx.xx    ]       │             │
      └────────────────└───────────────────┘───────────────────────┴─────────────┘

ACTION:              move to                view by Tag
      [Select...      ▼]   [collection...    ▼]   [...            ▼]
      ┌──────────────────┐ ┌──────────────────┐   ┌────────────────┐
      │ Select...        │ │ collection...    │   │ ...            │
      │ View Selected    │ │ collection Z     │   │ tag 3          │
      │ Remove from Collection│ collection A   │   │ tag 4          │
      │ Batch Edit Tags  │ │ collection B     │   │ other...       │
      │ Delete Items     │ │ collection C     │   └────────────────┘
      └──────────────────┘ │ collection D     │         ╲view
              ╲action      │ collection E     │          query 328
              query 324    │ create collection│
                           └──────────────────┘        FIG. 14
                               ╲collection             collection web
                                query 326              page 440
``` category GUI 480

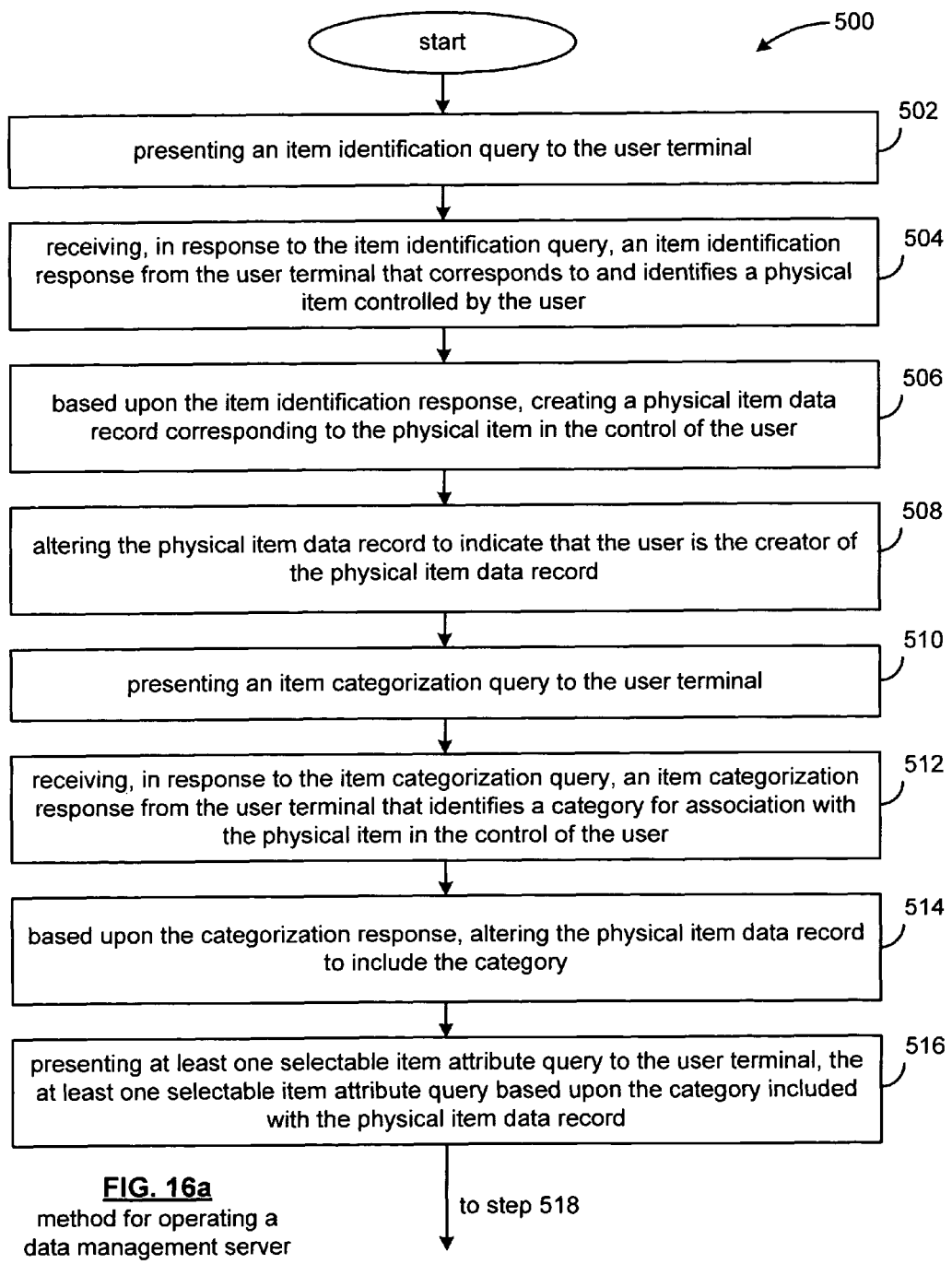

method for operating a
data management server

RAPID ITEM DATA ENTRY FOR PHYSICAL ITEMS IN THE CONTROL OF A USER IN AN ITEM DATA MANAGEMENT SERVER

CROSS-REFERENCE TO RELATED APPLICATIONS

The present application is a continuation-in-part of and claims the benefit of U.S. application Ser. No. 11/486,709, filed Jul. 14, 2006, for "Item Data Management over a Data Network for Physical Items in the Control of a User," which claims priority pursuant to 35 U.S.C. §119(e) to U.S. Provisional Application Ser. No. 60/771,135, filed Feb. 6, 2006, to U.S. Provisional Application Ser. No. 60/743,733, filed Mar. 24, 2006, to U.S. Provisional Application Ser. No. 60/743,735, filed Mar. 24, 2006, to U.S. Provisional Application Ser. No. 60/743,734, filed Mar. 24, 2006, to U.S. Provisional Application Ser. No. 60/743,737, filed Mar. 24, 2006, and to U.S. Provisional Application Ser. No. 60/743,736, filed Mar. 24, 2006, all of which are hereby incorporated by reference in their entirety.

BACKGROUND

1. Technical Field

The present invention relates generally to server systems accessible by user terminals, and more particularly to server systems providing physical item database services to users over a network.

2. Related Art

Historically, collectors, business owners, and others have kept written listings and/or ledgers that identify their physical items, whether they are collectibles, household possessions, business equipment, product inventory, or other physical items. The written listings/ledgers typically included additional information regarding the physical items, for example, quantity, value, physical characteristics, model number, serial number, et cetera. Generation of these listings/ledgers was difficult. Further, when the status of the physical items represented in the written listing/ledger changed, it was very difficult to alter the written listings/ledgers to represent the change in status.

As technology advanced, computer based inventory programs replaced written listings/ledgers. While the computer based programs moved the record keeping from a hand-written to an electronic format, the burdensome data entry and organizational requirements for interacting with the computer based inventory programs remained with the user. Data entry for dissimilar physical items still necessitated repeating the input process multiple times, even when using a computer-based program.

Often, collectors, business owners, and others required information relating to their physical items once the data was entered into the system. In obtaining this information, these persons accessed the Internet, particularly looking to ecommerce sites for such information. Ecommerce sites, however, had generated information that was limited to specific search terms selected by a user, and not based upon the items in the user's control. That is, information returned in a search tool is limited to the capability of the user to generate a sufficient search string—that is, to have the requisite "knowledge to know what they do not know." As a result, time and energy was needlessly expended refining a search that in the end may not render a suitable result for the user.

Accordingly, a need exists to increase the efficiency for creation, data entry and organization of physical items with computer-based inventories, including the information for the physical items.

BRIEF DESCRIPTION OF THE DRAWINGS

FIG. 9 is an illustration of a collection summary web page created by the item data management server according to an embodiment of the present invention;

FIG. 10 is an illustration of an item view web page that the item data management server presents to the user via the user terminal according to an embodiment of the invention;

FIG. 11 is an illustration of an edit/create collection graphic user interface according to an embodiment of the invention;

FIG. 14 is an illustration of a collection web page according to an embodiment of the invention;

FIGS. 16a and 16b are flow diagrams illustrating a method in an item data management server to capture, store, organize, and present information regarding a plurality of physical items in the control of a user according to an embodiment of the invention;

DETAILED DESCRIPTION OF THE DRAWINGS

Figure 1:
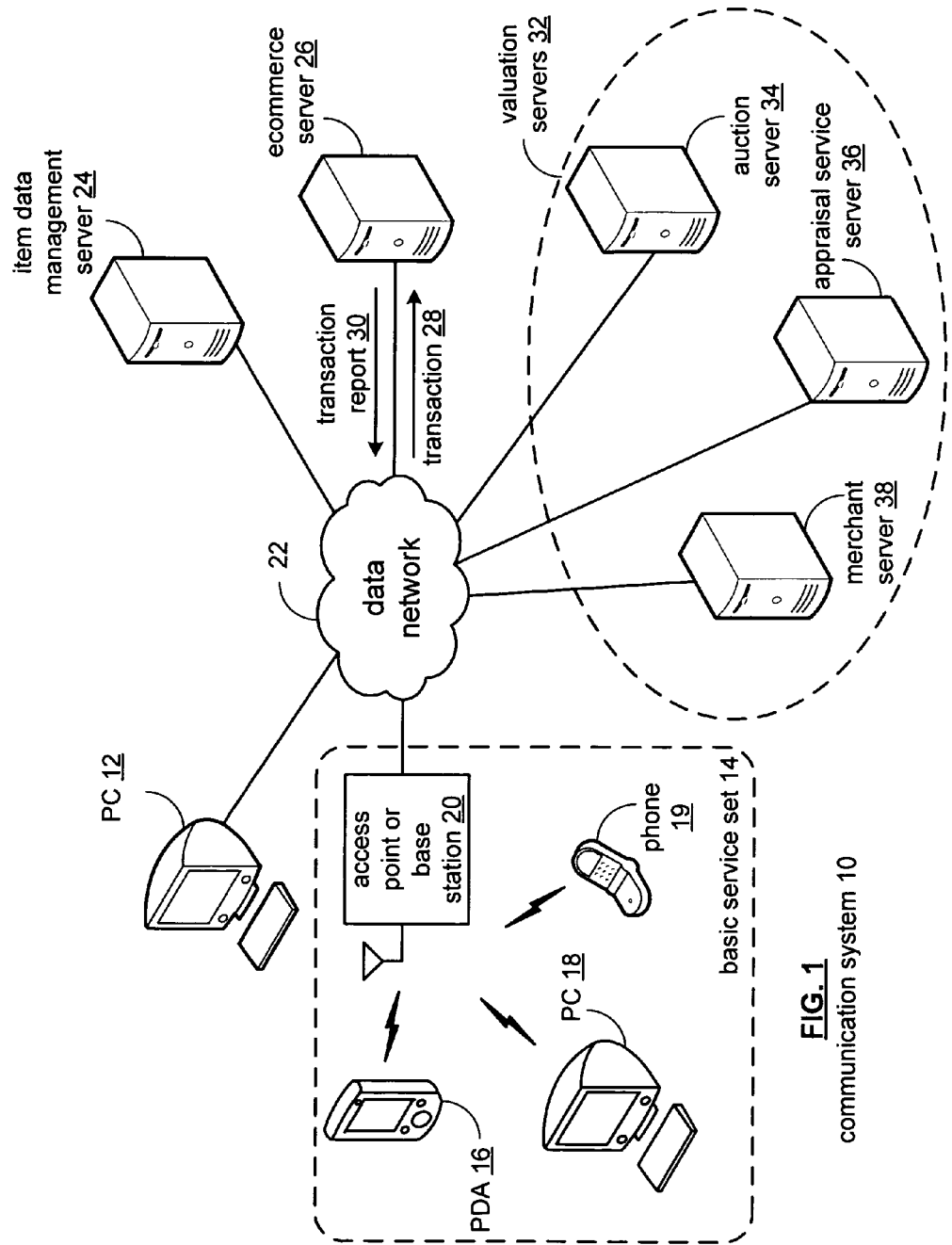
FIG. 1 is a functional block diagram illustrating a communication system with an item data management server according to an embodiment of the invention.

FIG. 1 is a functional block diagram illustrating a communication system 10 that includes circuit devices and network elements and operation thereof with an item data management server according to one embodiment of the invention. More specifically, the communication system 10 includes a network service area 14, or basic service sets ("BSS"), and a plurality of communication devices coupled via a data network 22. The network service area 14 is coupled to the data network 22 through a base station or access point 20. The wireless communications devices of the network service area 14 may include a personal digital assistant ("PDA") 16, personal computers 18, which may be a desktop computer or a laptop computer, and/or a cellular telephone 19.

The base station or access point 14 has an associated antenna or antenna array to communicate with the wireless communication devices in its service area. Typically, the wireless communication devices 16, 18, and 19 register with the particular base station or access point 14 to receive services from the communication system 10.

Typically, base stations are used for cellular telephone systems and like-type systems, while access points are used for in-home or in-building wireless networks. Regardless of the particular type of communication system, each wireless communication device includes a built-in radio and/or is coupled to a radio. For packet or data transmission, cellular communication systems provide packet-based communication and interaction with data networks in accordance with applicable standards specifications (for example, 3GPP2, 1xRTT, et cetera.).

The communication devices serve as a user terminal, and are communicatively coupled to the item data management server 24 via the data network 22. The item data management server 24 provides the capturing, storing, organizing and presenting of information regarding a plurality of physical items in the control of a user. The details of the item data management server 24 will be described in greater detail with reference to FIGS. 2 through 28.

The data network 22 may be a single data network, a plurality of data networks that are coupled to communicatively couple a user terminal to the item data management server 24. The data network 22 may be the Internet, a X.25 network, or private networks such as a local area network (LAN) or a combination thereof.

Other servers of the communications system 10 are accessible by the item data management server 24 in support of the functionality or services of the item data management server 24. For example, the network system 10 includes an ecommerce server 26, and valuation servers 32. The valuation servers 32 include an auction server 34, and appraisal service server 36, and a merchant server 38. As one of ordinary skill in the art may appreciate, the server functions, whether pertaining to an item data management server 24, an ecommerce server 26, or the valuation servers 32, may be carried out through individual servers and/or a combination of servers coupled across a network (such as a local area network, a wireless local area network, a wide area network, et cetera), and that the servers may be shown as single function devices for the purpose of an illustrative example.

The ecommerce server 26 facilitates commercial transactions over the data network 22. An ecommerce service provider enables and services secure communications (such as via a secure socket layer (SSL)), provides credit card processing functionality, provides inventory functionality, provides sale facilitation between two parties (for example, as through an auction transaction), et cetera. In operation, when a user engages in a transaction via the item data management sever 24, the ecommerce server 26 receives a transaction 28, processes the transaction and returns a transaction report 30.

The valuation servers 32 provide information and data for the item data management server 24 for valuation estimates and/or appraisals of physical items in the control of a user, as reflected through physical item data records stored on the item data management server 24. The item data management server 24 accesses the valuation servers, such as a merchant server 38 and/or an auction server 34, to retrieve data relating to auction values and commercial sale values of the physical item. With these values, the item data management server 24 can generate a valuation estimate through a sum average valuation or other suitable valuation method. Paid appraisal services are also accessible via an appraisal service server 36, which provide appraisal-value documentation, with electronic certificates, for an item based upon the attributes for a physical item.

In operation, the item data management server 24 engages in a plurality of searches and server accesses to arrive at a sum-average or best-fit average valuation. For example, item data management server 24 may determine the valuation of the physical item, or items, by accessing various on-line sites including, such as auction sites, various reference book and/or magazine sites to retrieve data for making a valuation. For example, if the item is an automobile, the item data management server 24 may survey sites such as Kelly's Blue Book (bbk.com), Edmunds.com, Autobytel.com, Cars.com and/or CarFax.com and solicit valuations based on the physical item attributes (such as vehicle identification number, mileage, accessories, make, model, year, repair history, et cetera). When multiple valuation references are returned to the item data management server 24, the sum-average valuation or valuation may also be based on a normal, or Gaussian, distribution curve.

Furthermore, general research can be conducted over the network 22 through the item data management server 24 based upon the attributes responses stored for each of the physical items of the database. This has the advantage of having the information readily available for subsequent research, with the attributes for each of the physical items to more particularly achieve specific results pertaining to a physical item.

Figure 2:
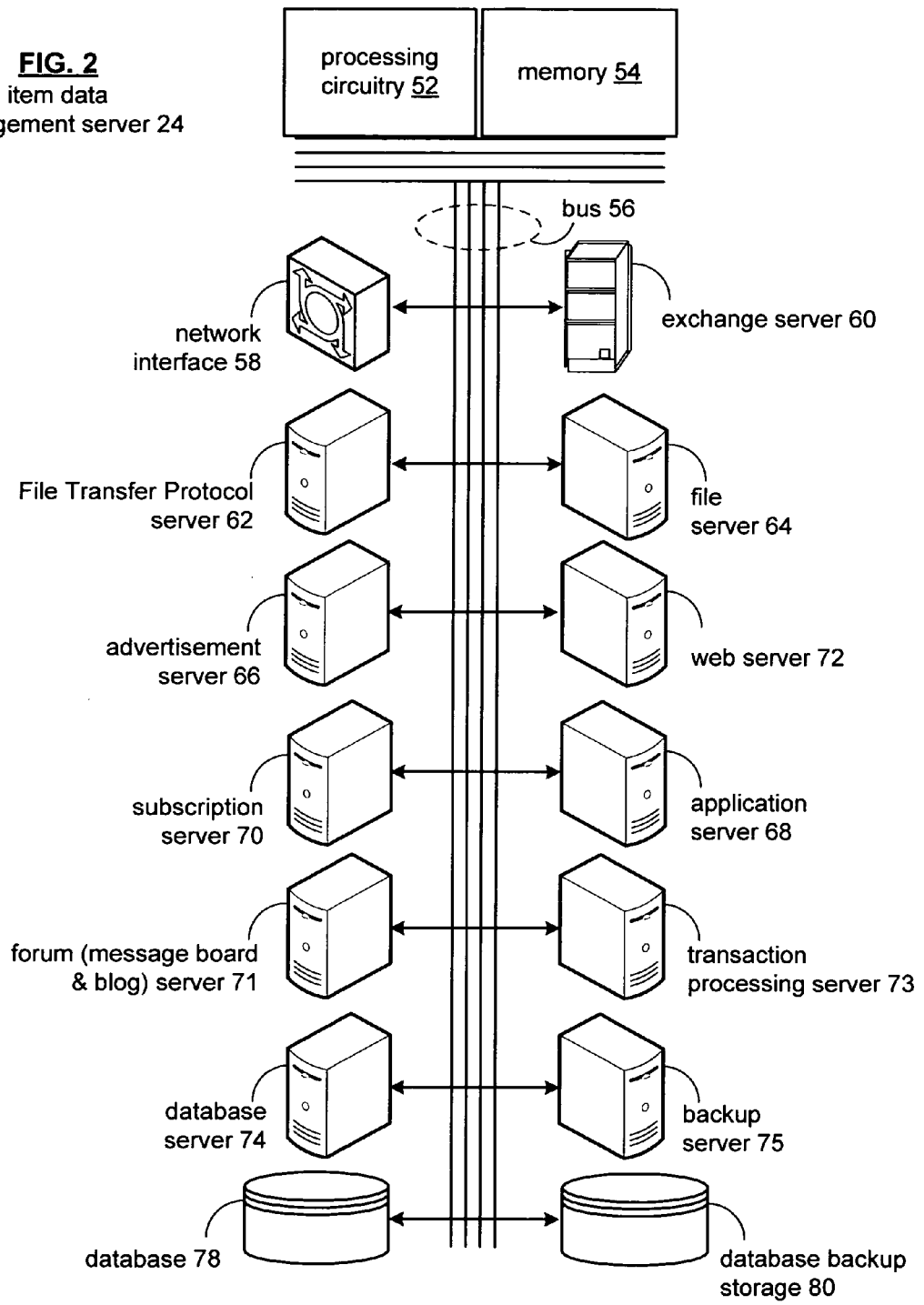
FIG. 2 is a block diagram that provides a system level overview of the item data management server according to an embodiment of the invention.

FIG. 2 is a block diagram that provides a system level overview of the item data management server 24. The item data management server can be a self contained unit containing the functionality to capture, store, organize and present information regarding a plurality of physical items in the control of a user, or embodied as a distributed system the includes multiple application-specific servers and network components.

The item data management server 24 includes processing circuitry 52 and memory 54 that stores operational instructions that cause the processing circuitry 52 to carry out the methods and/or processes of the present invention. The processing circuitry 52 operates pursuant to an operating system such as IBM OS/2, Linux, UNIX, Microsoft Windows, Apple OS X, SUN OS, and other commercially available operating systems that provides functionality for the services provided by the present invention. The operating system or systems may reside at a central location or operate as a distributed resource.

The memory 54 stores software programs or modules that cause the processing circuitry 52 to perform tasks such as, but not limited to, facilitating client requests, system maintenance, security, data storage, data backup, data mining and document/report generation. The provided functionality may be embodied directly in hardware, in a software module executed by a processor or in any combination of thereof. Further, software operations may be executed, in part or wholly, by one or more servers or a client's system, via hardware, software module or any combination thereof.

The memory 54 may be provided as RAM memory, flash memory, ROM memory, EPROM memory, EEPROM memory, registers, hard disk, a removable disk, a CD-ROM, DVD, optical disk, or any other form of suitable storage medium. The memory may be a self-standing device or units coupled to the processor such that the processor can read information from, and write information to, the memory. In the alternative, the memory may be integral to the processor.

The item management server 24 includes a network interface 58, an exchange server 60, a File Transfer Protocol server 62, a file server 64, an advertisement server 66, an application server 68, a subscription server 70, a web server 72, a forum (message board and blog) server 71, a transaction processing server 73, a database server 74, a backup server 75, a database 78, and a database backup storage 80. Each of the servers or databases may be duplicated or mirrored to provide system redundancy and promote maintenance and the integrity of the data by being hot swappable. Also, the servers as shown provide individual functions; however, multiple server functions may be consolidated onto a single server platform that include sufficient processing and storage resources, a single server function may be provided on a distributed server platform that includes sufficient processing and storage resources. The processing circuitry is in communication with these components via a bus 56. In the instance of a distributed system, a local area network provides the bus 56.

The network interface 58 supports data transmission with the data network 22. The exchange server 60 provides messaging services such as an email client and groupware applications (for example, shared calendars). The applications of the exchange server 60 may be accessed via a POP3 (Post Office Protocol) and IMAP4 (Internet Messaging Access Protocol) through clients such as Mozilla Thunderbird and Lotus Notes for email access to email clients, such as subscribers to the item data management server 24. In operation, the exchange server 60 provides customer interaction and customer relationship management functions with users of the item data management server 24.

The FTP (File Transfer Protocol) server 62, and file server 64 provide document access functionality. The FTP server 62 and file server 64 stores files (such as documents, images, media) and makes them available over the data network 22 and the ability to transfer files between two internet sites. The subscription server 70 provides online registration and subscription management service for physical item capture, storage, organization, and information presentation.

The application server 68 delivers content over the data network 22 by interpreting web site traffic and constructing web pages based on a dynamic content repository, such as that provided via a physical item data record relating to the physical item in the control of a user. The content is personalized based on site visitor information, such as the content viewed, the content of the physical item data record, past transaction history, or user defined preferences.

The advertisement server 66 stores, retrieves, and manages advertisements for presentation to a user in the control of a physical item. In operation, the advertisement server 66 manages advertisement services for third-party advertisers affiliated with the item data management server 24, manages locally generated advertisements, and generates statistics regarding advertisement effectiveness (such as access clicks by users, page access, et cetera). Further, the advertisement server 66 can deliver advertisements based upon attributes of the physical items in the control of the user, as well as based upon user attributes such as keyword, IP address, domain, weekday, hour of day, language, browser, operating system, et cetera.

The transaction processing server 73 processes financial transactions (such as credit card transactions, banking transactions, PayPal transactions, bartering transactions, et cetera) of the user with other subscribers or third-party entities relating to a physical item in the control of the user. In operation, when the user is entering into a transaction, they are linked to a secure payment information query (where the customer is given visual clues of the Secure Socket Layer (SSL) encryption for the form).

When the user submits payment information, the transaction processing server 73 processes the transaction and gives the user immediate transaction status—approval, decline or other status indication. Further, if the transaction processing server 73 approves the transaction, the exchange server 60 sends an e-mail message containing the user's contact information (such as the mailing information) and an transaction summary both to the user and the other party, which may another subscriber to the item data management server 24 or a merchant. The transaction processing server 73 may provide other services, such as mailing labels, when the user has conveyed a physical item in their control to another party.

The forum server 71 provides message board and blog services to the users of the item data management server 24. Examples of the services may be frequently asked question (FAQ) management for the user community, and to support communities created by the users to allow the sharing information either openly or in a moderated manner, such as though a message board or blog (that is, a web log).

The web server 72 stores HyperText Markup Language ("HTML") or EXtensible Markup ("XML") documents that can be retrieved via a Web browser at the user terminal.

The database server 74 executes database software for access to data stored in the database 78 that enables a user and/or a database administrator to enter, organize, and select data in a database. The backup server 75 and database backup storage 80 provides data redundancy and backup services to physical item data records. Examples of a database management system ("DBMS") software, or database client programs, are Microsoft Access, MySQL, et cetera. Databases are organized by fields, records and files. A field is a single piece of information; a record is one complete set of fields; and a file is a collection of records. An alternative concept in database design is known as Hypertext. In a Hypertext database, any object, whether it be a piece of text, a picture or a film/video, can be linked to other objects and is useful for organizing large amounts of disparate information.

The database on the database server 78 and/or the backup server 75 may be of a hierarchical, relational or distributed database structure. In a distributed database structure, two or more data files are located at different computers coupled across a computer network. Because the database is distributed, different users can access the database contents without interfering with one another. A DBMS, however, periodically synchronizes the scattered databases to make sure that all users have consistent data.

Figure 3:
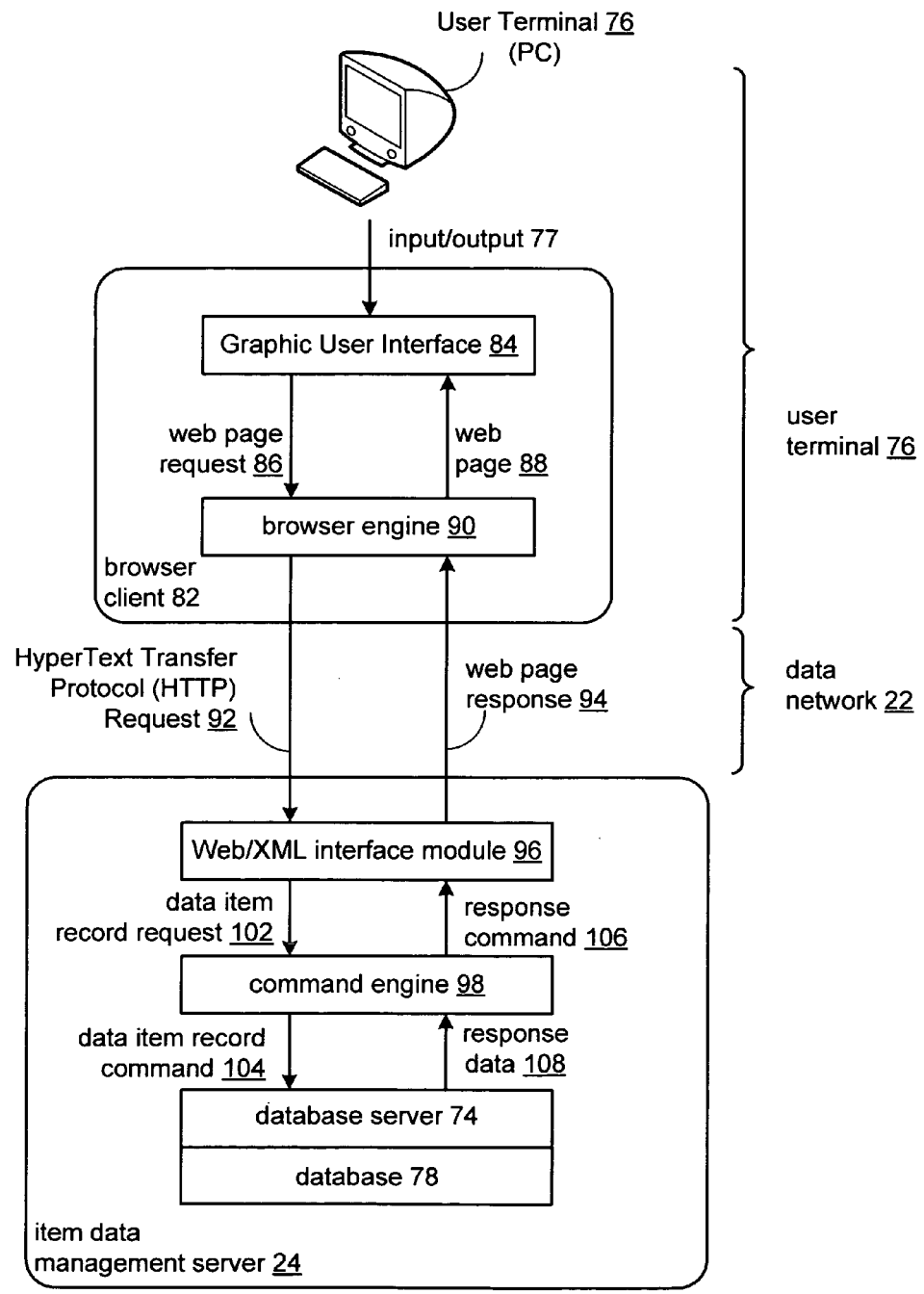
FIG. 3 is a block diagram of a system level operation illustrating a functional or client level operation of a user terminal with the item data management server across a data network according to an embodiment of the invention.

FIG. 3 is a block diagram of a system level operation illustrating a functional or client level operation of the user terminal 76 with the item data management server 24 across a data network 22.

The user terminal 76 (personal computer) includes a browser client 82 having a graphic user interface ("GUI") 84 and a browser engine 90 that may be an Asynchronous JavaScript and XML ("AJAX") engine, a HyperText Transfer Protocol ("HTTP") engine, et cetera. The browser client 82 may be a provided by a browser application such as Netscape, Firefox, Opera, Safari and/or Internet Explorer. For secure transmission, the selected browser client employs SSL protocol or other such secure transmission protocol.

The item data management server 24 includes a HyperText Transfer Protocol/eXtensible Markup Language (HTTP/XML) interface module 96, a command engine 98, and database system components 74 and 78. In general, the browser client 82 accesses the item data management server 24, which stores or creates resources such as HyperText Markup Language ("HTML") files and images. Between the user terminal 76 and the item data management server 24 is the data network 22, which as noted earlier, may include several intermediaries, such as proxies, gateways, tunnels, et cetera.

The user terminal 76 receives input and provides output via input/output 77 to the browser client 82 through the graphic user interface ("GUI") 84. The browser engine 90 receives a web page request 86 from the GUI 84. An AJAX engine implements a process for using a number of existing technologies together, including the following: HTML or XHTML, Cascading Style Sheets, JavaScript, the Document Object Model, XML, XSLT, and the XMLHttpRequest object for incrementally updating the web page presented and displayed through the GUI 84. The AJAX engine operates to increase web page "responsiveness" by exchanging small amounts of data with the item data management server 24 behind the scenes, so that an entire web page does not have to be reloaded each time the user makes a change, as well as increase interactivity, speed, and usability of a web page.

The browser engine 90 sends a HTTP request 92 to the item data management server 24, where HTTP is a request/response protocol used for providing a convey the request across the data network 22. The browser engine 90 uses the HTTP for transmitting HyperText Markup Language (HTML) pages across data networks (such as the Internet). HTTP is a request/response protocol for transmitting HyperText Markup Language ("HTML") web pages across data networks 22, such as the Internet, between browser clients and servers. HTTP is defined under IETF Request for Comment ("RFC") 2616.

The Web/XML interface module 96 receives the HTTP request 102 and processes therefrom the data item record request 102. The data item record request 102 is based upon the input of the user via the user terminal 76. Examples of a data item record request include a query to the item data management server 24, a query response, data input regarding a physical item, a command for additional information, et cetera.

The command engine 98 receives the data item record request 102, and with the data item record command 104, accesses the database systems 100 and retrieves response data 108. The command engine 98 provides a response command to the Web/XML interface module 96. The Web/XML interface module sends a web page response 94. The browser engine 90, processes the web page response 94, and presents a web page 88 to the GUI 84 for interaction with a user via the user terminal 76.

Figure 4:
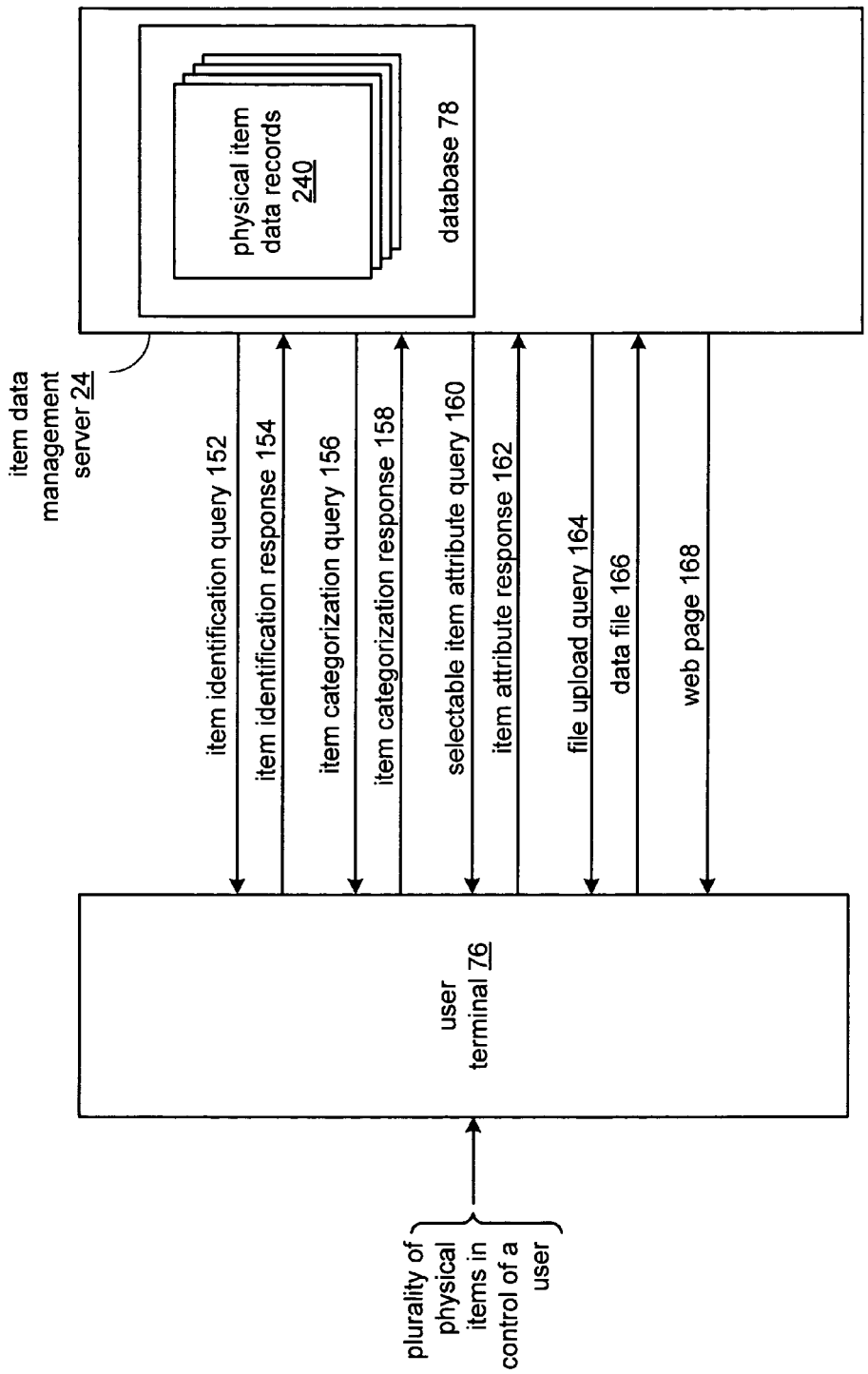
FIG. 4 is a block diagram depicting interaction between a user terminal and an item data management server according to an embodiment of the invention.

FIG. 4 is a block diagram depicting the interaction between user terminal 76 and the item data management server 24 to capture, store, organize, and present information regarding a plurality of physical items in the control of a user.

Through the user terminal 76, a user registers and pays a service fee through the subscription server 70 (see FIG. 2) for the service features available from the data item management sever 24. In the setup process, the subscription server 70 queries the user through the GUI 84 via software applications designed to illicit user information via the user terminal. The transactions and data transfer between the client and server takes place via a secured communications link.

With an account established, a user populates the database 78 with physical items in the control of the user, including images, physical item descriptions, physical item valuation information, condition or quality descriptions of the physical item, et cetera. In response to the user inputs, the item data management server 24 compiles a physical item data record 240 for each of the physical items in the control of the user in the database 78. Also through the subscription with the item data management server, the user is provided with access to the combined non-private portions of the physical items controlled by other users. The graphic user interfaces for entering information regarding a physical item and the physical item data record structure created by an item data management server are described in detail with reference to FIGS. 5 through 7.

In operation, the item data management server 24 presents an item identification query 152 to the user terminal 76. The item data management server 24 receives, in response to the item identification query, an item identification response 154 from the user terminal 76 that corresponds to and identifies a physical item controlled by the user. The item identification response 154 may include a simple object identifier of the physical item or a more detailed identifier. For example, when the physical item is a stamp, the item identification response 154 may simply be "collectible stamp," or as a more descriptive example, the item identification response 154 may be "1978 Fifty Cent Panda Commemorative Stamp." To preserve associated database capacity, the item identification response may be limited to a predetermined character length.

Based upon the item identification response 154, the item data management server 24 creates a physical item data record 240 corresponding to the physical item in the control of the user. Further, based upon the user subscription, the item data management server 24 alters the physical item data record 240 to indicate that the user is the creator of the physical item data record 240.

The item data management server 24 presents an item categorization query 156 to the user terminal 76, and receives, in response to the item categorization query 156, an item categorization response 158 from the user terminal 76 that identifies a category for association with the physical item in the control of the user. For simplicity, the item data management server 24 may provide a predetermined list of categories, as well as accepting a category submission generated by the user. An example of a predetermined list of categories is "Antiques, Art, Books, Comic Books, Coins, Jewelry, Sports Memorabilia, Stamps, Video Games," et cetera. Based upon the categorization response 158, the item data management server 24 alters the physical item data record 240 to include the category.

The item data management server 24 presents at least one selectable item attribute query 160 to the user terminal 76, the selectable item attribute query 160 is based upon the category included with the physical item data record 240. That is, the attributes stored in the physical item data record for a physical item provide as complete a description as possible for the physical item, making refined, specific Internet searches possible, reducing the time and effort for a user to update their knowledge of their physical items with respect to uniqueness, rarity, valuation, et cetera. Without such a structure, the search on an item-by-item basis would readily become tedious and overly time consuming. Further, the attributes stored in the physical item data record for a physical item also facilitate trading, barter, and community communication activities (such as a message board or a blog) related to the physical item.

As an example, if the category provided with the item categorization response 158 is "stamps," at least one attribute query is "stamp year." Other examples of attributes based upon the "stamp" category are those associated with acquisition of the stamp by the user, the valuation of the stamp, and the stamp characteristics. Examples of the attributes with respect to a category will be described in detail with respect to FIG. 7 in the context of a physical item data record 240.

The item data management server 24 receives, in response to the at least one selectable item attribute query 160, at least one item attribute response 162 from the user terminal 76 that identifies an attribute of the physical item in the control of the user. Based upon the at least one item attribute response 162, the item data management server 24 alters the physical item data record 240 to include the attribute included in the at least one item attribute response 162.

The item data management server 24 presents a file upload query 164 to the user terminal 76, and receives, in response to the file upload query 164, a data file 166. The item data management server 24 associates the data file with the physical item data record 240. The data file 166 may be an image file, a document file, and/or a media file that includes video data, voice data, audio data, image data, text data, or a combination thereof. The data file may also be provided as a link to the data file, where the link may be to a local document to the user terminal 76, or at another Internet Protocol address or other computer identifier, in which the item data management server 24 accesses and uploads the document using the document link. Also, documents, images, and media can be digitally signed (item ID plus account public identity) when uploaded.

With the populated physical item data record 240, the item data management server 24 creates a web page 168 that includes information from the physical item data record 240, an advertisement link based upon the physical item data record, and at least one other link selected based upon the physical item data record. The item data management server 24 presents the web page 168 to the user terminal 76. The details of the web page 168 are discussed with reference to FIG. 8.

Figure 5:
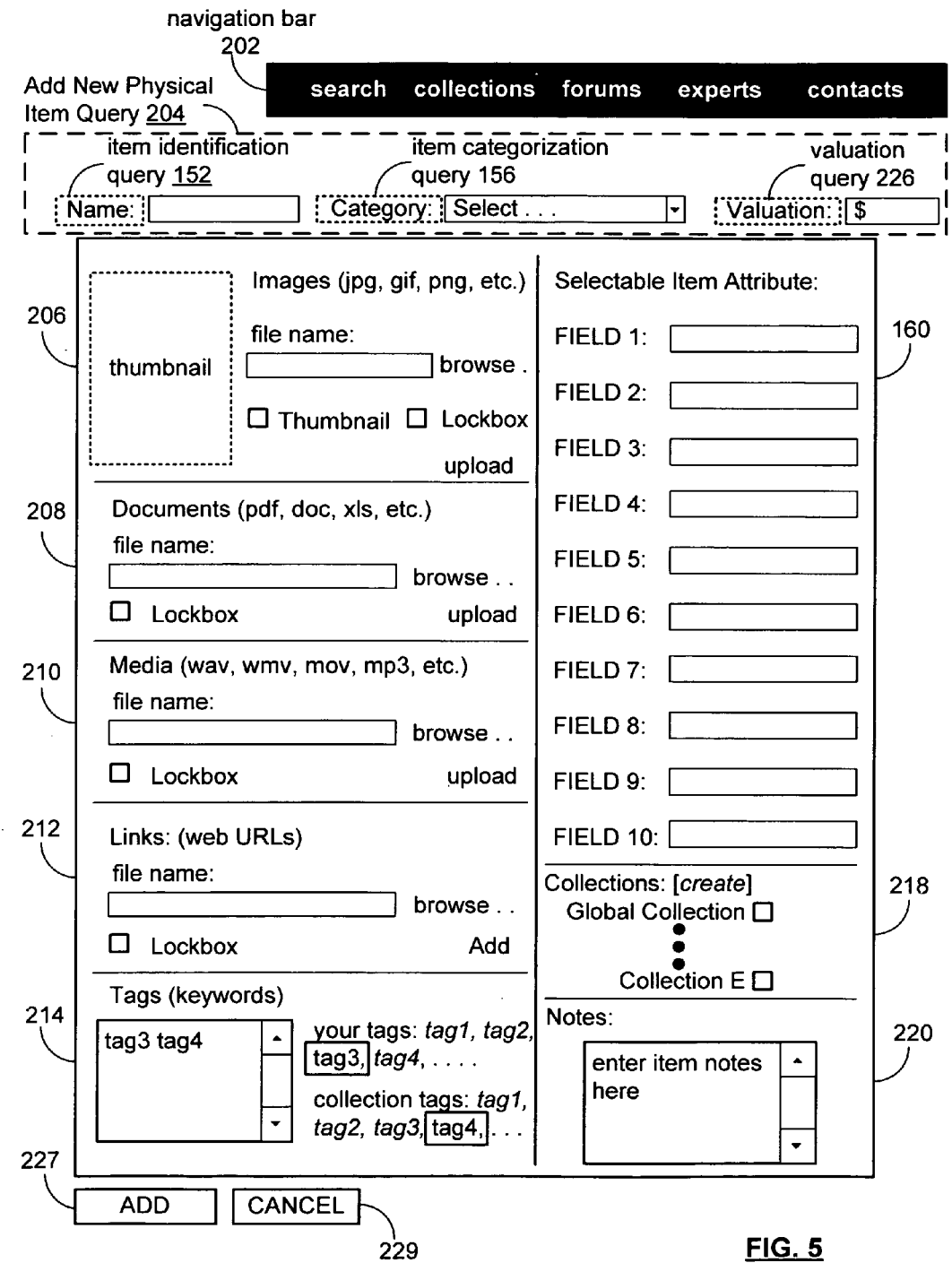
FIG. 5 is an illustration of an add physical item graphic user interface provided to the user for input and output through the user terminal according to an embodiment of the invention.

FIG. 5 is an illustration of an add physical item GUI 200 provided to the user for input and output through the user terminal 76. The item data management server 24 presents queries through the add physical item GUI 200 to the user terminal 76, and is able to receive responses to the queries and alter the physical item data record.

The add physical item GUI 200 includes a navigation bar 202, an add new physical item query field 204, a file upload query 164—including an image file upload query 206, a document file upload query 208, and a media file upload query 210, a link add query 212, a tag query 214, a physical item attribute query 216, a collections query 218, and item notes query 220.

The navigation bar 202 includes search, collections, forums, experts, and contacts commands for navigating to other functions within the web site supported by the item data management server 24. The add new physical item query field 204 includes an item identification query 152, an item categorization query 156, and a valuation query 226.

The item data management server 24 presents these queries for each of the plurality of physical items in the control of the user, and receives responses to these queries that are then used to create and alter physical item data records 240.

The file upload query 164, which includes the image file upload query 206, the document file upload query 208, and media file upload query 210 include fields for accepting file names with suitable file formats, as indicated by the file extensions, for the respective query. That is, for an image file, examples of suitable file formats for web page creation include jpg (Joint Photographic Experts Group), gif (Graphic Interchange Format), png (portable network graphics), tiff (Tagged Image File Format), et cetera. For a document file, examples of suitable file formats include pdf (Portable Document Format), xls (Excel), doc (Word format), et cetera. For a media file, examples of suitable file formats include wav (WAVeform audio), wmv (Windows Media Video), mov (Quicktime movie format), mp3 (MPEG Layer 3), et cetera.

The file names may be located using a directory browse feature to access the directory structure of the user terminal 76, or a distributed device associated with the user terminal 76. The filename and directory path are entered into the filename fields, and upon pressing the "upload" command, the item data management server 24 receives and associated data file 166, upon pressing the "upload" command within the respective queries.

The add link query 212 includes a file name or universal resource link ("URL") designation that may be received by the item data management server 24, which adds the hyperlink to the physical item data record 240, but not the linked object.

A lockbox option is provided with the file upload query 164 that includes the image file upload query 206, the document file upload query 208, and the media file upload query 210, and with the link add query 212. The lockbox option causes the associated data file or link to be invisible to other users when the item is added to a collection that otherwise provides viewing and/or altering permissions to other users.

The tag query 214 receives tags, or keywords, from the user that the item data management server 24 associates with the physical item in the control of the user. The tag query 214 provides tags under a "your tags" basis or under a "collection tags" basis.

The item data management server 24 presents selectable item attribute query 160 to the user terminal 76. The selectable item attribute query 160 is based upon the category selected in the item categorization query 156. That is, the item data management server 24 provides a list of applicable attributes under the category. The user does not require pre-existing attributes associated with a category. Further, an information link can be associated with the attribute to provide information to the user when selected. In this manner, when information is sought regarding the physical item, the user does not need to research and formulate the attributes to retrieve suitable information from an Internet search engine—the item data management server 24 has created a database to efficiently retrieve pertinent information, including research materials, background, advertising solicitations, et cetera.

The number of fields available in the selectable item attribute query 160 varies according to the category selected in the item categorization query 156. For example, when the category is "stamps," the selectable item attributes presented in place of the "field" labels may be "Scott #," "Nationality," "Year," "Issue," "Denomination," "Grade," "Issue," "Grade," et cetera. The attributes are selected when the user places text in response to the attribute query.

The item data management server 24 presents a collections query 218, and receives in response a collections query response. The collections query response reflects the collections to which the physical item belongs. Generally, small businesses, groups, and individuals frequently have large collections of physical items, and maintenance and care of the collection require inventories and activity recording pertaining to individual physical items of the collection.

The item data management server 24 alters the physical item data record 240 to include an association with the selected collection reference data structures for the physical item. That is, when a physical item is included in a collection, the physical item data record 240 is updated to reflect the collection set in which it belongs. Collections are discussed in detail with respect to FIGS. 9 through 14.

The item data management server 24 also presents a notes query 220, in which the user may respond by placing text notes in the area provided. This query permits the user to provide idiosyncratic information regarding the physical item that may not be otherwise addressed through the item categorization query 156 and the selectable item attribute query 160 based upon the category.

When the user has entered or provided responses to the queries of the add physical item GUI 200, the user may respond by pressing the "ADD" command 227. In the alternative, the user may not respond by pressing the "CANCEL" command 229.

The "ADD" command transmits, and the item data management server 24 receives, the responses from the respective query fields. With this information, the item data management server 24 creates a physical item data record 240 in response to the item identification query, alters the physical item data record 240 to indicate that the user is the creator of the physical item data record, and alters the appropriate fields of the physical item data record 240 with the responses provided by the user.

Figure 6:
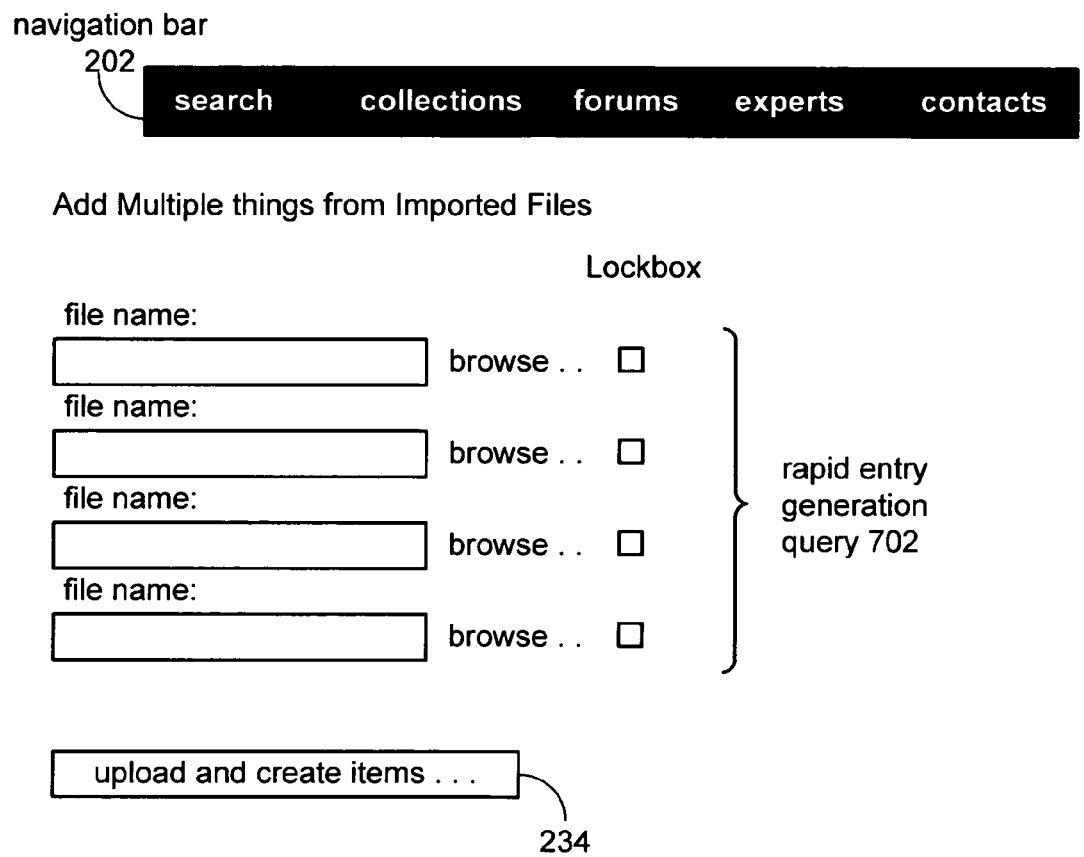
FIG. 6 is an illustration of a multiple item import graphic user interface that may be provided to a user for input and output through the user terminal according to an embodiment of the invention.

FIG. 6 is an illustration of a rapid item import GUI 230 that the item data management server 24 may provide to a user for input and output through the user terminal 76. The rapid item import GUI 230 provides a rapid entry generation query 702, which takes advantage of user database or list files having a dissimilar application file formats to that of the database 78, yet contain a plurality of physical items in the control of the user. When receiving a multiple item query response, the item data management server 24 uses a conversion utility to convert data from other file formats (such as Excel, TurboTax, Quickbooks, Quicken, et cetera) to populate a plurality of physical item data records of the database 78. Also, the item data management server 24, via the rapid item import GUI 230, accepts images, video, audio, and/or document files to create a physical item data record in the server database 78.

The rapid entry generation query 702 includes filename fields to receive file names that may be directly entered or may be located using a directory browse feature to access the directory structure of the user terminal 76, or a distributed device associated with the user terminal 76. The filename and directory path are entered into the filename fields, and upon pressing the upload and create items command 234, the item data management server 24 receives and creates physical item data records 240 for the physical items identified from the uploaded files.

The rapid item import may also be provided via a graphic image file, in which multiple items are represented. The item data management server 24 provides a utility application that automatically parses the individual physical items from the file. The parsed images can then be selected by the user for inclusion in the database 78 of the item data management server 24 as physical item data records through the add physical item GUI 200. Rapid item data entry is discussed in further detail with reference to FIGS. 21 through 28.

Figure 7:
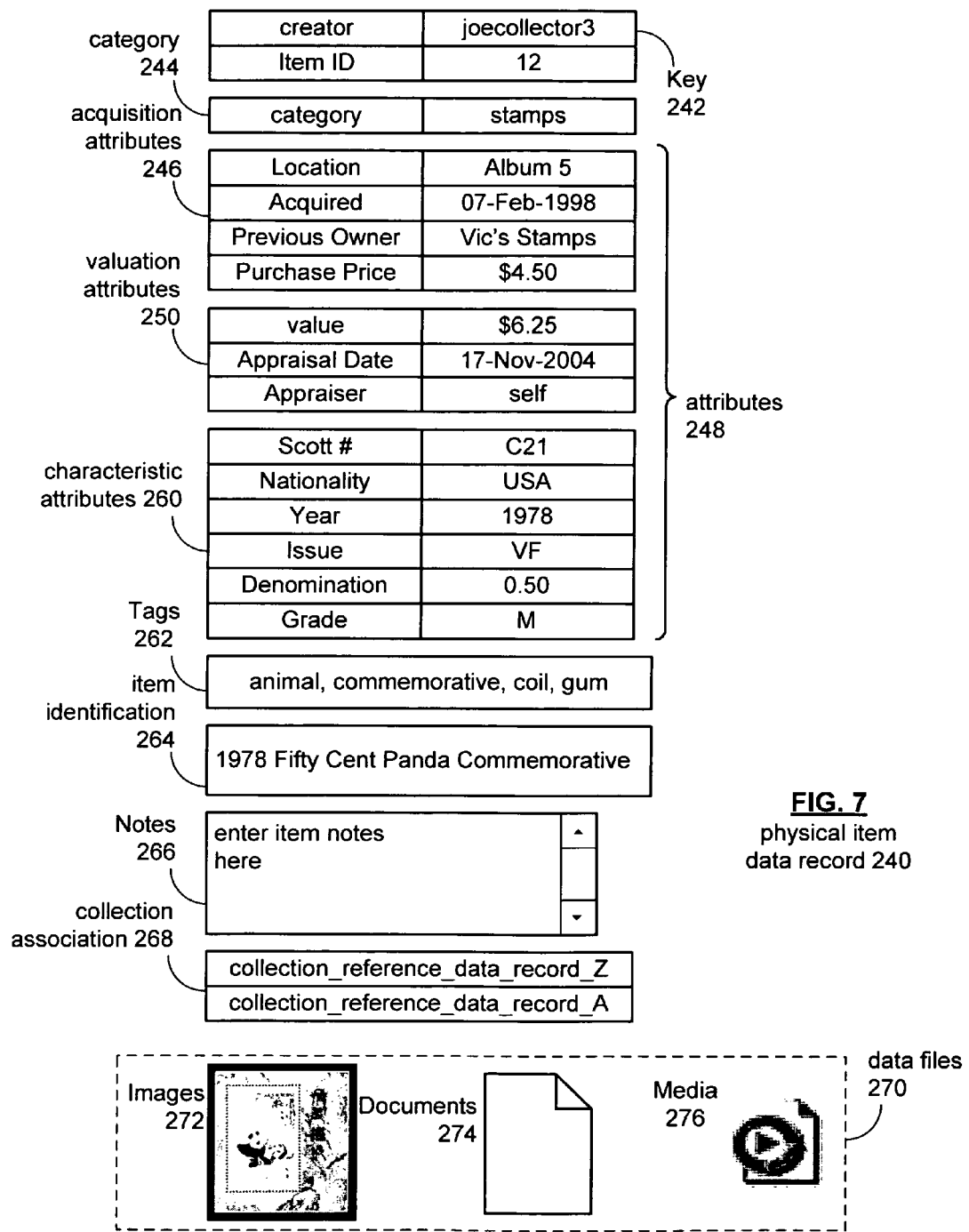
FIG. 7 is an illustration of a physical item data record according to an embodiment of the invention.

FIG. 7 is an illustration of a physical item data record 240 according to an embodiment of the invention. The item data management server 24 stores, alters, and organizes the physical item data record 240 in a database 78. As noted earlier, the item data management server 24 alters the physical item data record with received query responses from the user terminal 76. Further, for new database entries regarding physical items in the control of a user, the item data management server 24 creates a physical item data record for that physical item.

The physical item data record 240 is not a static database structure, but may change as activity occurs with respect to physical item in the control of a user. Examples of change include the addition of information, or information updates (that may result from commercial transactions involving the physical items), valuation activity, appraisal activity, et cetera.

The physical item data record 240 includes a key 224, a category 226, attributes 216, tags 214, item identification 222, notes 220, and data files 166. The attributes 216 include acquisition attributes 228, valuation attributes 236, and characteristic attributes 238. The key 224 has a creator field and an item ID field. With the login or registration of the user, the item data management server 24 alters the physical item data record 240 to indicate that the user is the creator. The item ID is generated by the database server application. The category field 226 is contains result of the categorization response 158. The attributes 216 are based upon the result of the categorization response 158, physical item data record conforms to the attributes. That is, the attributes change based upon the category received in the categorization response 158.

Figure 8:
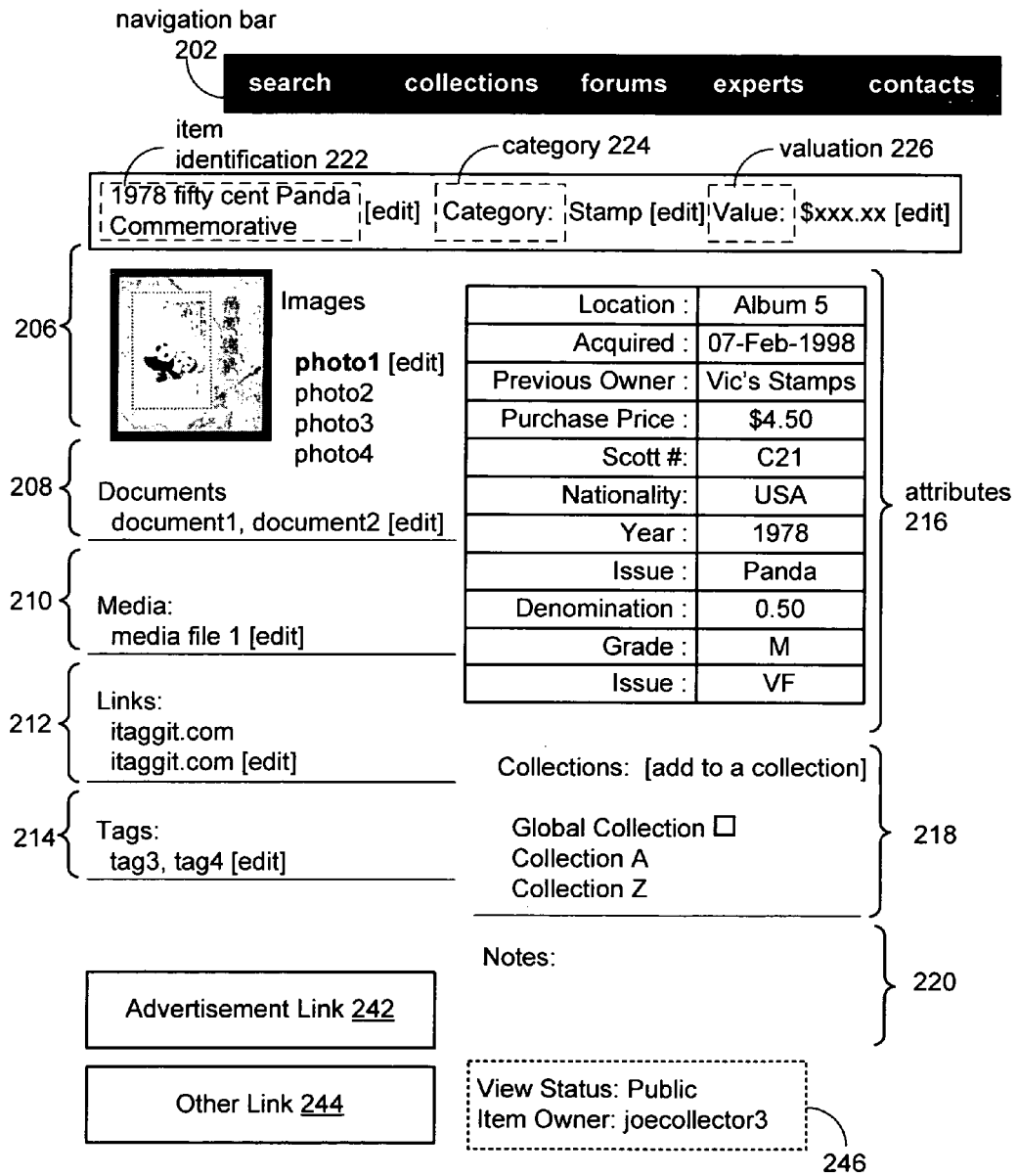
FIG. 8 is an illustration of a web page created by the item data management server according to an embodiment of the invention.

FIG. 8 is an illustration of a web page 168 created by the item data management server 24 according to an embodiment of the invention. The web page 168 formats and presents information from the physical item data record 240, an advertisement link 242 based upon the physical item data record, and at least one other link 244 based upon the physical item data record.

The web page 168 includes a navigation bar 202, an item identification 222, a category 224, and a valuation 226. The information from the physical item data record 240 is shown in an image field 206, a document field 208, a media filed 210, a link field 212, a tag field 214, attributes fields 216, a collection field 218 and notes field 220. The web page 168 may also include the status identifier field 246, which identifies whether the item is public, and the owner of the physical item.

The advertisement link 242 is based upon the physical item data record 240 with respect to an attribute and/or category associated with the physical item. That is, as the item data management server 24 alters the physical item data record 240 based upon query responses, the advertisement link 242 changes. For example, as the value or appraised valuation of a physical item increases, the advertisement link 242 may provide sales and/or commercial transaction links to an on-line auction house. The other link 244 may be an additional advertisement link, or may be a resource link relating to additional information or background relating to the physical item identified in the physical item data record with respect to at least one attribute and/or category associated with the physical item. Further, the advertising link 242 and the other link 244 may be transitioning links. That is, the item data management server 24 changes the links upon a web page refresh initiated by the user, by the browser client 82 (based upon a refresh timer), or as the item data management server 24 may push to the user terminal 76 on a periodic basis.

That is, the item data management server 24 provides targeted advertising (such as banner ads targeted to a specific item attribute and/or category) as well as affiliate modules for linking hypertext data directly into the web page 168 (that is, book collections directly into a bookstore online search engine). The advertising link 242 may also be provided as contextual searching, and the item data management server 24 may incorporate such a feature through third party vendor applications and/or services such as Google Adsense. Following enrollment, the Adsense application enables the item data management server 24 to provide text and image advertisements in the created web pages presented to the user terminal. The Google search generates advertisement links based on website content (that is, the physical item data records), the user's geographical location, and other factors.

FIG. 9 is an illustration of a collection summary web page 280 created by the item data management server 24 according to an embodiment of the present invention. The collection summary web page 280 summarizes the collections relating to the user.

The collection summary web page 280 includes a navigation bar 202, a collection identifier field 282, a collection owner field 284, a collection type/community field 286, a collection valuation field 288, an items field 290, and an edit/add collection query 292.

The collection identifier 282 is a unique identifier to permit an assembly or inclusion of physical item data records under a specific collection. As indicated in the collection owner field 284, the collection may be specific to the user, or may be a collection created by another user of the item data management server 24 in which the present user has been granted permission to view and/or alter the physical item data record. The collection type/community field 286 specifies whether the collection is private or shared. When private, the collection is only accessible by the user. When shared, the collection may be accessed by other users of the item data management server 24. Further when shared, and the collection belongs to the user (that is, "[me]"), the user may designate the access permissions by other users to the collection. Generation of a community of users is discussed in detail with respect to FIGS. 11 through 13.

The collection valuation field 288 reflects the valuation total for a respective collection as a whole (as distinguished by the value of its individual items). By setting up different collections, a user may be able to determine which combinations of physical item data records have a greater value than others. The items field indicates the number of physical item data records that are associated with a collection. The collection, when shared, permits other users to add their physical item data records to the collection, forming virtual sets that can be valuated and appraised. The significance being that the valuation of a collection may be greater than the valuation of the individual physical items that make up the collection. These information aids the user in decisions to enter into commercial transactions to buy or sell items relating to a given collection.

The collection summary web page 280 also includes a create collection query 268, which the item data management server 24 presents to the user terminal 76. When create collection query 292 is pressed, the item data management server 24 receives a collection creation response from the user terminal 76. Collection population, community generation/creation, and collection views are discussed in detail with reference to FIGS. 10 through 14.

FIG. 10 is an illustration of an item view web page 320 that the item data management server 24 presents to the user through the user terminal 76 according to an embodiment of the invention. The item view web page 320 presents, in summary fashion, an item list 330 having underlying physical item data records for the physical items in the control of the user which have been created and/or modified by the item data management server 24. The item view web page 320 provides information for a physical item that includes include the "item name," the "category" and "type" assigned to the physical item, the "origin" regarding the geographic origin of the physical item (country and/or region), and a "valuation" for the physical item.

The item view web page 320 also presents queries to a user terminal 76 including an action query 324 and a collection query 326. For an action query 324 or a collection query 326 to act with respect to a physical item, the item is selected from the item list 330. An item is selected by a user clicking on a selection box to place a "check" icon, thus selecting the item. In this manner, a plurality of physical item data records 240 may be associated with a collection reference data record through the collection query 326.

The collection query 326 also presents to a user terminal 76 a list of selectable user created collections (such as those named collection Z, A, B, et cetera) for associating the physical item record with a collection. The user may have created one or all of the collections, while others may have been created by other subscribers to the item data management server 24. The collection query 326 also presents the user with an opportunity to select "create collection" to create additional collections when the list does not provide one suitable to the user. Creation of an edit/create collection GUI is discussed in detail with reference to FIG. 11.

The action query 324 presents to user terminal 76 a list of multiple possible actions to a selected item (or items) in the item list 330. For example, the action query 324 allows the user to provide a response of "View Selected," (in which the item data management server 24 creates a web page 168), "Remove from Collection," "Batch Edit Tags," and/or "Delete Items."

The activity bar 322 provides action commands to a user for activities for the physical items. Examples of activities are research an item (such as for colors, construction, rarity, et cetera), sell or buy a physical item, initiate or respond to trade inquiries with other users, engage in forum discussions regarding an item, seek merchandising information for an item, generate reports on the physical item data records for the physical items, et cetera.

FIG. 11 is an illustration of an edit/create collection GUI 360 according to an embodiment of the invention. The edit/create collection GUI 360 includes a navigation bar 202, a collection creation query 362, a community creation query 366, a permissions query 368, a subscriber query 370, a subscriber action query 372, a community list 374, an "ADD" query 376, a "CANCEL" query 378, and a "DELETE" query 379.

The item data management server 24 presents the edit/create collection GUI 360 when a user selects "create collection" from the item view web page 320 (see FIG. 10), the "create collection query 292" from the collection summary web page 280 (see FIG. 9), "add to a collection" from the collections field 218 (see FIG. 8), et cetera. Depending on the permissions provided through an associated community of users, a user may edit a collection created by another user.

Through the edit/create collection GUI 360, the item data management server 24 presents a collection creation query 362 to the user terminal 76. The user, through the user terminal 76, responds with a collection query response in the provided field. When the user does not elect to share the collection by leaving the share query 364 unselected, the item data management server 24 receives the collection query response when the user presses the "ADD" command 376.

When the user elects to share a collection, the user "checks" the share query 364. When the share query 364 is checked, the item data management server 24 presents a community creation query 366 via the edit/create collection GUI 360. The user enters a community creation response, such as a community name, to the community creation query 366. The subscriber query 370 allows the user to associate a plurality of subscribers with the community creation query 366. Through the subscriber action query 372, the user may add additional subscriber identifiers to the subscriber query 370, or delete subscribers from the subscriber query 370, when checked, by selecting the delete command.

Associated with the subscriber query 370 is the permissions query 368. The user selects permissions to the subscribers of the subscriber query 370 to specify access rights to specific users and/or groups of users associated with a community. In other words, permissions allow a user to control the ability of others to view or make changes to the contents of a collection within the control of the user. In this manner, a first group of subscribers to be associated with the community reference data structure have both a right to review and a right to alter a physical data item data record contents of the collection data structure by adding records or deleting records from the collection data structure, and a second group of subscribers of the plurality of subscribers associated with the community reference data structure have the right to review but not the right to alter the physical item data record contents of the collection data structure.

Also, when a user specifies access rights to their collection, an invitation query may also be generated and provided to the specified users and/or groups of users. Responses to the invitation query then confirm whether or not the other users will participate in the shared collection.

The edit/create collection GUI 360 allows other communities of a plurality of communities 374 to be associated with the collection being created under the collection creation query 362. Further, the user is able to edit existing communities where the user is the creator. The user may change the subscriber affiliations for communities when users are added to the item data management server 24. Notably, also, the item data management server 24 may update the subscriber list for a community when items are conveyed or are sold to other users, allowing a user to maintain a collection while the user control information is updated through an underlying physical item data record 240.

When the user presses the ADD command 376, the item data management server 24 receives the responses that the user enters to the queries. In this manner, the item data management server 24 presents the collection creation query 362 to the user terminal 76, and receives, in response to the collection creation query, a collection creation response from the user terminal 76. The item data management server 24, based upon the collection creation response, creates a collection reference data structure, which is discussed in detail with reference to FIG. 12. In the alternative, the user may press the CANCEL command 378 to exit without sending a response to the queries being sent to the user terminal 76. Further, the user may delete the collection by pressing the DELETE collection command 379.

Figure 12:
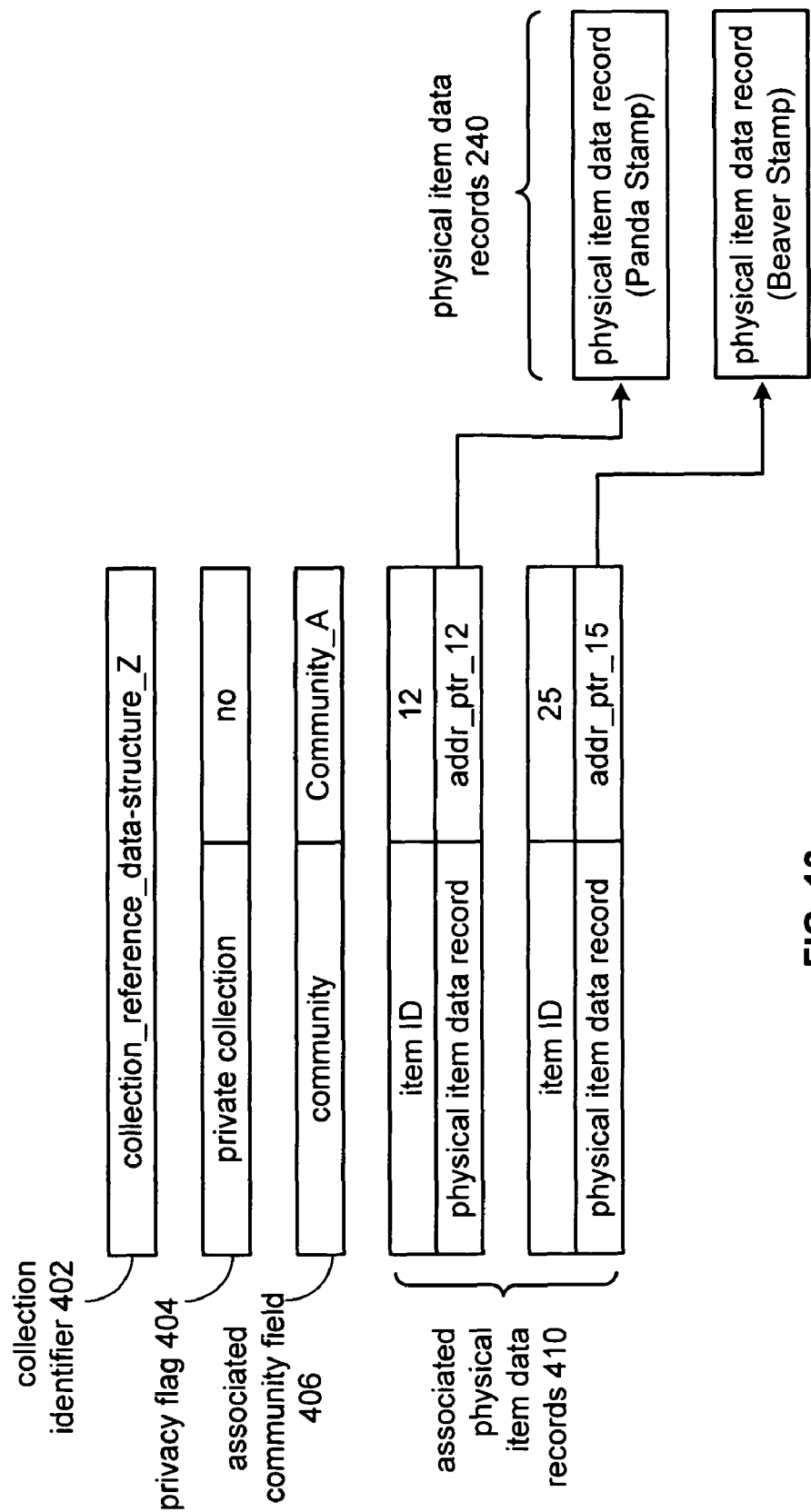
FIG. 12 is an illustration of a collection reference data structure according to an embodiment of the invention.

FIG. 12 is an illustration of a collection reference data structure 400 in accordance with an embodiment of the invention. The collection reference data structure 400 includes a collection identifier 402, privacy flag 404, an associated community (or communities) 406, subscriber fields 408, and associated physical item data records 410.

The collection identifier 402 designates an identifier for the collection reference data structure 400. The privacy flag 404 indicates whether the collection is private to the creating user or public in nature, either to all subscribers to the item data management server 24, or to a specified group of users. When the privacy flag 404 indicates that the collection is private to the creating user, then the item data management server 24 would not access the community reference data structure relating to the associated community field 406.

When the privacy flag 404 is not set, or indicates that the collection is not private, then the item data management server 24 accesses the community reference data structure 420 related to the associated community field 406. The community reference data structure 420 is discussed in detail with reference to FIG. 14.

The physical item data records 410 are associated with the collection reference data structure 400. The item data management server 24 associates the physical item data records with the collection reference data structure 400, and alters the physical item data record (see FIG. 7) for the item to include an association with the collection reference data structure 400. The associated physical item data records 410 are associated through links or pointers to the physical item data records 240, such as indicated by item IDs (such as item ID 12 for the "Panda Stamp," and item ID 25 for the "Beaver Stamp") 25. In the example provided, collection Z is associated with the physical item data records 240 for the "Panda Stamp" and for the "Beaver Stamp." Based upon the collection reference data structure 400, the item data management server 24 creates a collection web page 440, which is discussed in detail with reference to FIG. 14.

Figure 13:
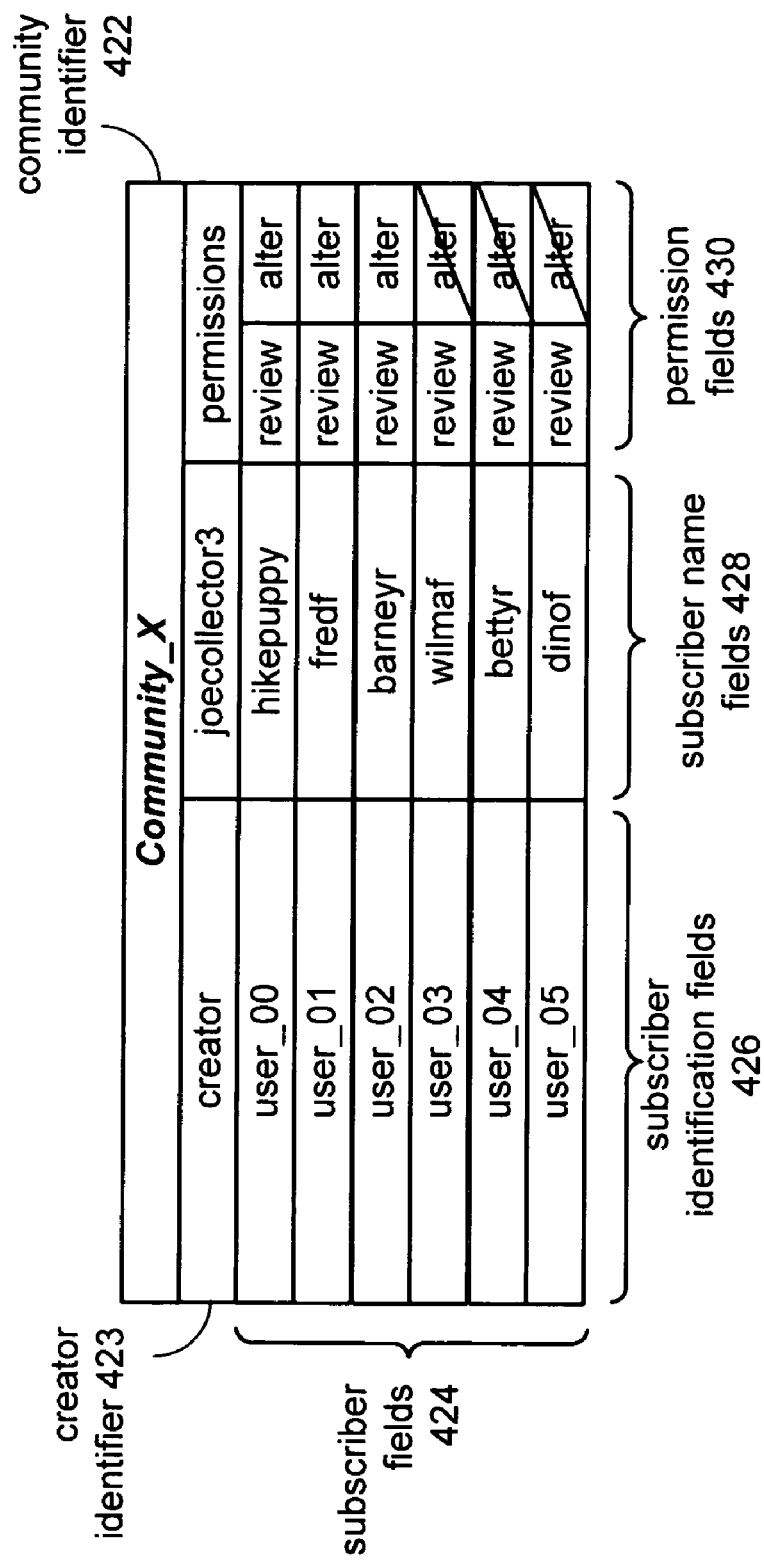
FIG. 13 is an illustration of a community reference data structure according to an embodiment of the invention.

FIG. 13 is an illustration of a community reference data structure 420 according to an embodiment of the invention.

The community reference data structure 420 includes a community identifier 422, a creator identifier 423, and subscriber fields 424. The subscriber fields 424 include subscriber identification fields 426, subscriber name fields 428, and permission fields 430.

The community reference data structure 420 results from the community creation query presented to the user terminal 76 via the community creation query 366 of the edit/create collection GUI 360 (see 11). The item data management server 24 receives, in response to the community creation query, a community creation response from the user terminal 76, and based upon the community creation response, creates a community reference data structure 420.

The creator identifier 423 identifies the creator belonging to the community. In this example, the creator is "joecollector3." The default permissions that the creator possesses are full permissions to review and alter physical item data records. The item data management server 24 associates a plurality of subscribers with the community reference data structure in the subscriber fields 424. Each field of the subscriber fields includes the subscribe identification fields 426 to provide a subscriber "key" for the database 78, the subscriber name field 428 stores the user names or "on-line" identity of the subscriber, and the permission fields 430 store the permissions the creator provides to each of the subscribers through the edit/create collection GUI 360 to alter the physical item data record contents of the collection reference data structure 400 (that is, whether they have a right to add physical item data records to, or delete physical item data records from, the collection reference data structure). In the example of FIG. 13, a first group of subscribers have both a right to review and a right to alter physical item data record contents of the collection data structure 400, and a second group of subscribers have the right to review but not the right to alter (as indicated by the "strike through" marks) the physical item data record contents of the collection reference data structure 400.

FIG. 14 is an illustration of a collection web page 440 according to an embodiment of the invention. The collection web page includes a listing of the plurality of physical item data records 448-452 associated with the collection reference data structure 400, and an advertisement link 444 and an other link 446, each of which may be related to the category designation of the physical item data records or attributes of the physical item data record for the physical items.

The collection web page 440 also presents queries to a user terminal 76 including an action query 324 and a collection query 326. For an action query 324 or a collection query 326 to act with respect to one (or several) of the physical item data records, the item is selected by a user clicking on a selection box to "check" to select the item.

The action query 324 presents to the user terminal 76 a list of multiple possible actions to a selected item (or items) in the item list 330. For example, the action query 324 allows the user to provide a response of "View Selected," "Remove from Collection," "Batch Edit Tags," and/or "Delete Items." The collection query 326 presents to the user terminal 76 a list of categories for moving a selected item to another collection, or to add the item to another collection, as well as creating another collection based upon the selected physical item data records.

The collection valuation field 442 may be a value greater than the individual pieces of the collection that is reflected in the valuation total field 454. That is, a complete set may have the greatest value, and by providing the collection to a community, additional valuations potentials are available. The collection, when shared, permits other users to add their physical item data records to the collection, forming virtual sets that can be valuated and appraised. The significance being that the valuation of a collection may be greater than the valuation of the individual physical items that make up the collection. These information aids the user in decisions to enter into commercial transactions to buy or sell items relating to a given collection.

The advertisement link 444 is based upon the collection reference data structure 400 and the associated plurality of physical item data records 240. The advertisement link may be based upon the valuation total 454 for the collection, attributes of the plurality of items in the collection, and/or upon the category or categories associated with the physical items. That is, when the item data management server 24 alters the physical item data record 240 for a physical item, the advertisement link 242 may change to reflect the addition of newer information. For example, as the value or appraised valuation of a physical item increases, the advertisement link 444 provides sales or transaction links to an on-line auction house. The other link 446 may be an additional advertisement link, or may be a resource link relating to additional information or background relating to the physical item identified in the physical item data record with respect to at least one attribute and/or category associated with the physical item. Further, the advertising link 444 and the other link 446 may be transitioning links. That is, the item data management server 24 changes the links upon a web page refresh initiated by the user, by the browser client 82 (based upon a refresh timer), or as the item data management server 24 may push to the user terminal 76 on a periodic basis.

In response to selection by the user of the advertisement link 444 presented on the collection web page 440, the item data management server 24 transmits a web page request to an ecommerce server, such as ecommerce server 26 (see FIG. 1). The item data management server 24 services a transaction with the user via the user terminal 76 and the ecommerce server 26, and receives a transaction report from the ecommerce server 26 reporting the transaction with the user via the user terminal 76 to the item data management server 24.

Figure 15:
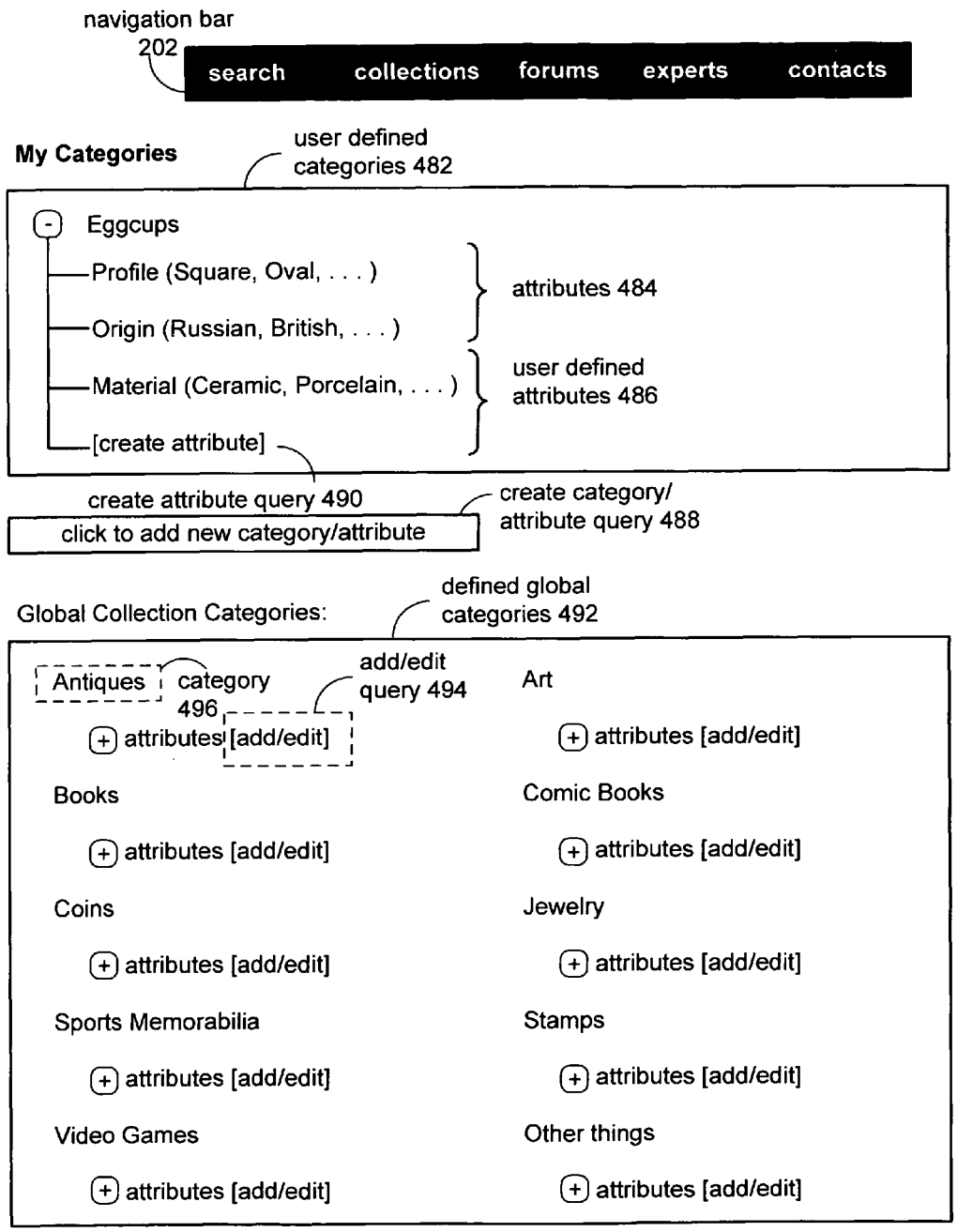
FIG. 15 is an illustration of a category graphic user interface according to an embodiment of the invention.

FIG. 15 is an illustration of a category GUI 480 according to an embodiment of the invention. The category GUI 480 includes user defined categories 482, a create category/attributes query 488, and a defined global categories 492. The user defined categories 482 each include a create attribute query 490.

The category GUI 480 provides a plurality of global collection categories 490 that includes at least one category 496 with associated attributes. The associated attributes may be added and/or edited via the add/edit query 494 based upon responses to the query by a user.

The user defined categories 482 include attributes 484, which the item data management server 24 may include as associated with the categories, and further may include user defined attributes 486. The create attribute query 490 allows a user to add attributes to a user-defined category through query responses. Also, the create category/attribute query 488 allows a user to add additional categories and associated category attributes in addition to those that the item data management server 24 provides as default categories.

The category GUI 480 operates to facilitate the addition of categories, attributes and/or classes for customizing the Global Collection Categories available for categorizing the physical items in the control of the user. For example, a user defined category of "Eggcups" is added to the Global Collection Categories via the user defined categories 482. The item data management server 24 associated attributes 484 with the user-defined category, such as a profile attribute, an origin attribute for the "Eggcups" category. With respect to user defined attributes, a user may add additional attributes as desired through the create attribute query 490 for association with a given user defined category. For example, a user defined attribute of "Material" provides collection of this attribute.

Figure 16B:
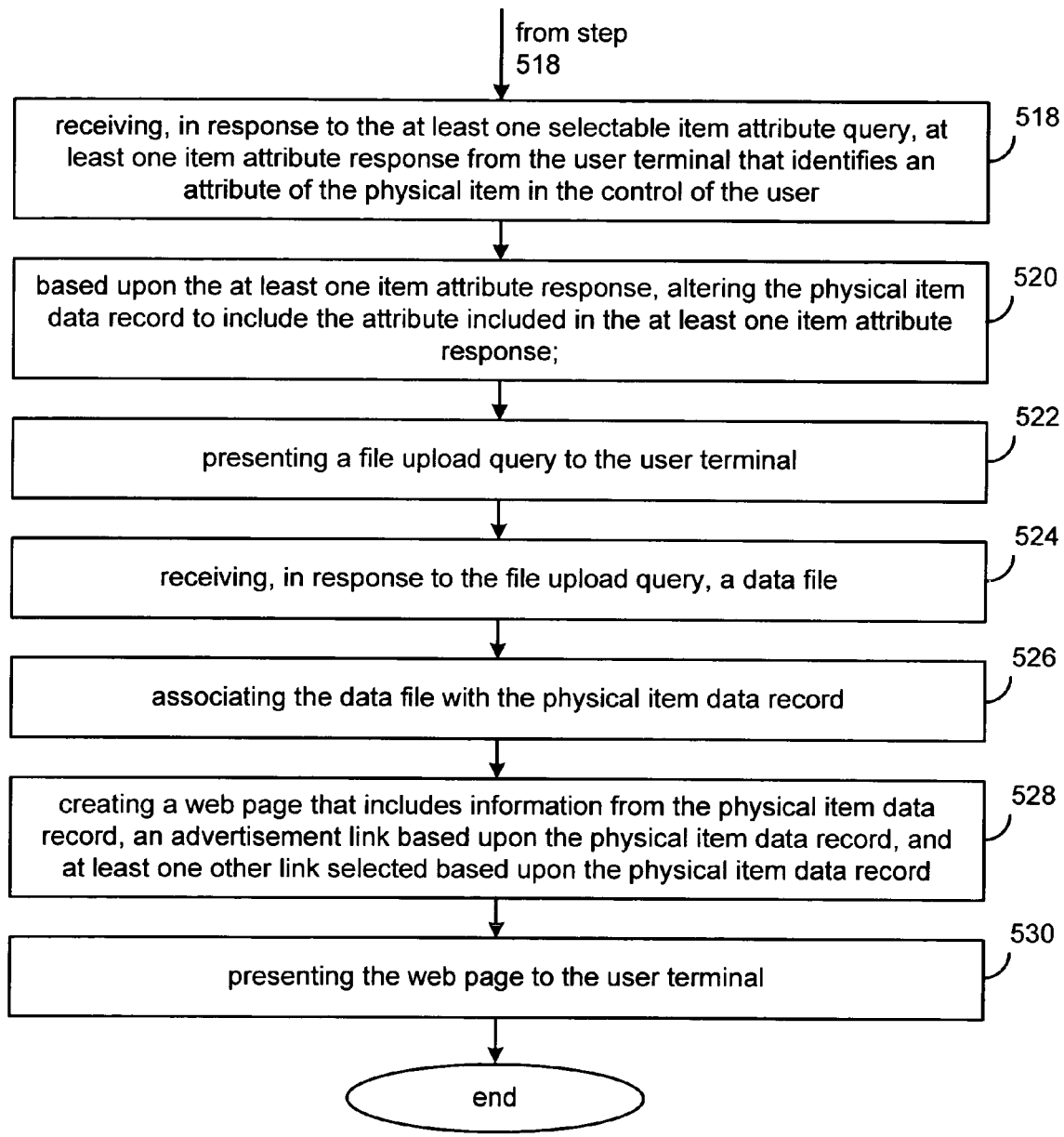

FIGS. 16a and 16b are a flow diagram illustrating a method 500 in an item data management server to capture, store, organize, and present information regarding a plurality of physical items in the control of a user according to an embodiment of the invention.

Beginning at step 502, the item data management server 24 presents an item identification query to the user terminal. The item data management server receives at step 504, in response to the item identification query, an item identification response from the user terminal that corresponds to and identifies a physical item controlled by the user. Based upon the item identification response, the item data management server creates at step, 506 a physical item data record corresponding to the physical item in the control of the user, and alters the physical item data record to indicate that the user is the creator of the physical item data record at step 508.

At step 510, the item data management server presents an item categorization query to the user terminal, and receives, in response to the item categorization query, an item categorization response from the user terminal that identifies a category for association with the physical item in the control of the user at step 512. Based upon the categorization response, the item data management server alters the physical item data record to include the category at step 514.

At step 516, the item data management server presents at least one selectable item attribute query to the user terminal. The at least one selectable item attribute query is based upon the category included with the physical item data record. The item data management server receives at step 518, in response to the at least one selectable item attribute query, at least one item attribute response from the user terminal that identifies an attribute of the physical item in the control of the user. Based upon the at least one item attribute response, the item data management server alters the physical item data record to include the attribute included in the at least one item attribute response at step 520.

At step 522, the item data management server presents a file upload query to the user terminal and at step 524 receives, in response to the file upload query, a data file, which is associated with the physical item data record at step 526.

At step 528, the item data management server creates a web page that includes information from the physical item data record, an advertisement link based upon the physical item data record, and at least one other link selected based upon the physical item data record. At step 530, the item data management server presents the web page to the user terminal.

Figure 17:
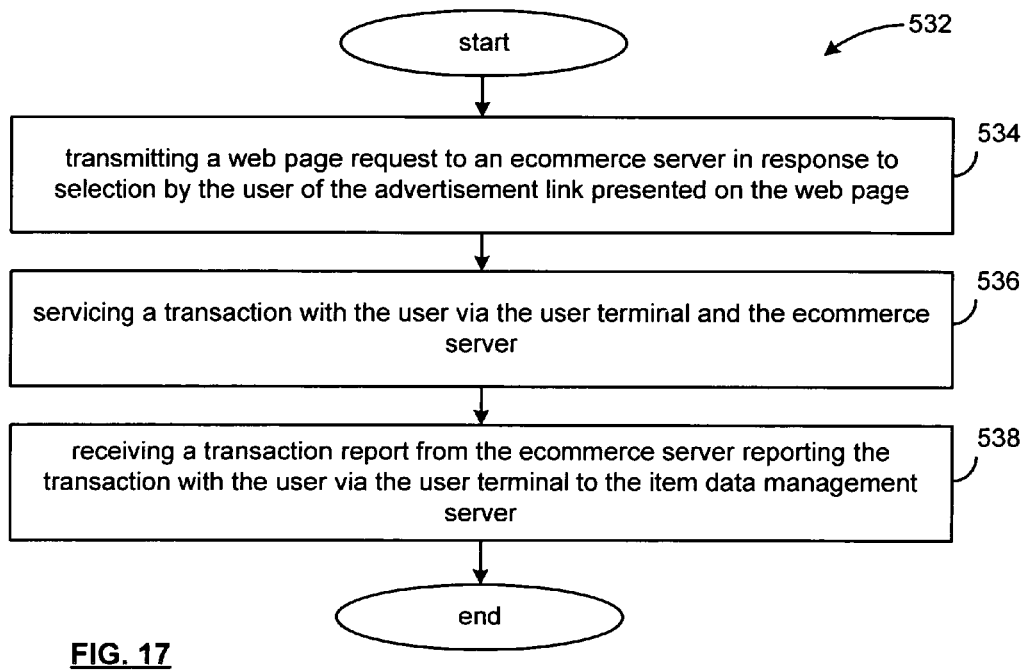
FIG. 17 is a flow diagram illustrating a method for further engaging an ecommerce server according to an embodiment of the invention.

FIG. 17 is a flow diagram illustrating a method 532 for further engaging an ecommerce server according to an embodiment of the invention.

In response to selection by the user of the advertisement link presented on the web page, the item data management server at step 534 transmits a web page request to an ecommerce server, such as ecommerce server 26 (see FIG. 1). The item data management server services a transaction with the user via the user terminal and the ecommerce server at step 536, and receives a transaction report from the ecommerce server at step 538 reporting the transaction with the user via the user terminal to the item data management server.

Figure 18:
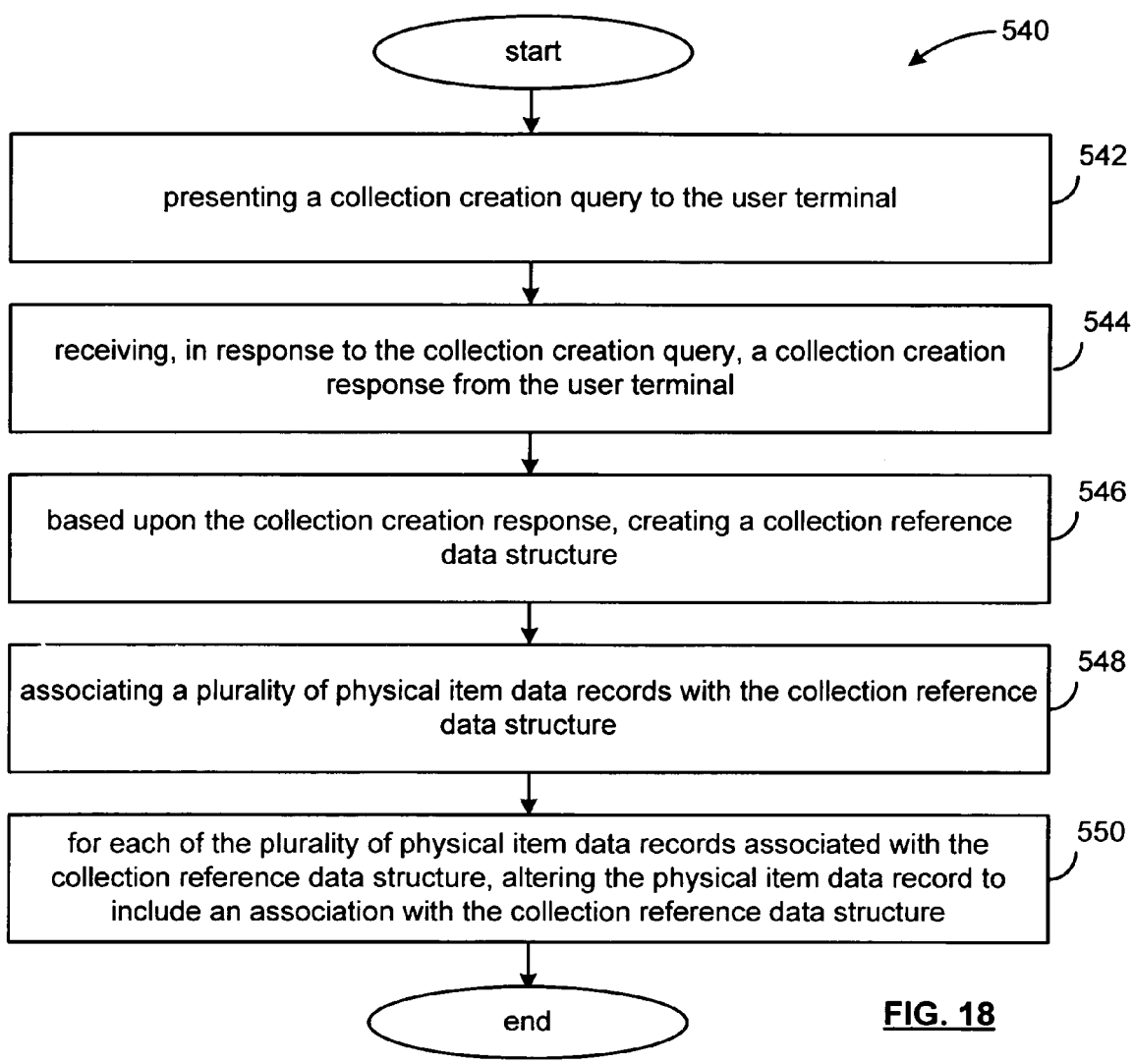
FIG. 18 is a flow diagram illustrating a method for further engaging in collection web page creation according to an embodiment of the invention.

FIG. 18 is a flow diagram illustrating a method 540 for further engaging in collection web page creation according to an embodiment of the invention.

At step 542, the item data management server presents a collection creation query to the user terminal, and receives at step 544, in response to the collection creation query, a collection creation response from the user terminal. Based upon the collection creation response, the item data management server at step 546 creates a collection reference data structure, and associates a plurality of physical item data records with the collection reference data structure at step 548. For each of the plurality of physical item data records associated with the collection reference data structure, altering the physical item data record to include an association with the collection reference data structure.

Figure 19:
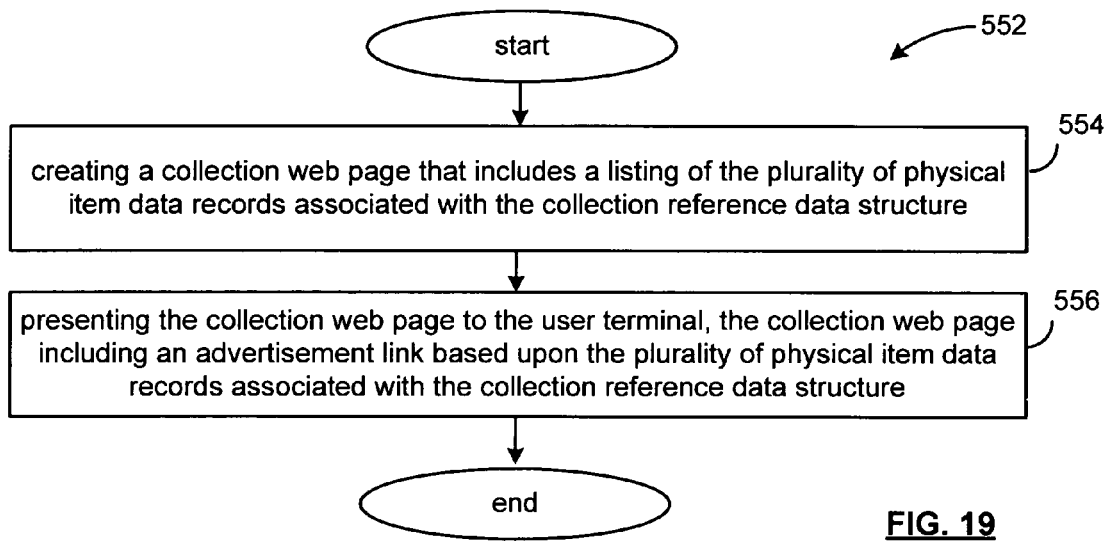
FIG. 19 is a flow diagram illustrating a method for further creating a collection web page according to an embodiment of the invention.

FIG. 19 is a flow diagram illustrating a method 552 for further creating a collection web page according to an embodiment of the invention.

At step 554, the item data management server creates a collection web page that includes a listing of the plurality of physical item data records associated with the collection reference data structure. The item data management server, at step 556, presents the collection web page to the user terminal, the collection web page including an advertisement link based upon the plurality of physical item data records associated with the collection reference data structure.

Figure 20:
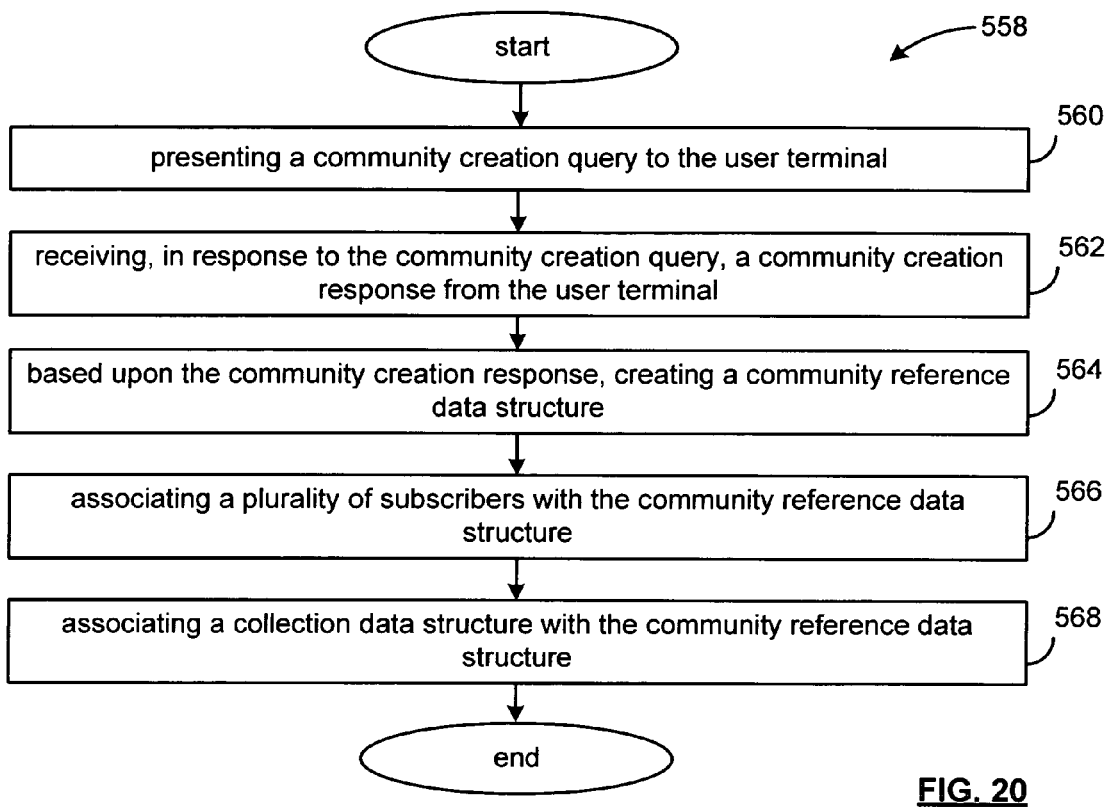
FIG. 20 is a flow diagram illustrating a method for further creating a community reference data structure according to an embodiment of the invention.

FIG. 20 is a flow diagram illustrating a method 558 for further creating a community reference data structure according to an embodiment of the invention.

At step 560, the item data management server presents a community creation query to the user terminal, and receives at step 562, in response to the community creation query, a community creation response from the user terminal. Based upon the community creation response, the item data management server at step 564 creates a community reference data structure. At steps 566 and 568, the item data management server associates a plurality of subscribers and a collection data structure with the community reference data structure.

Figure 21:
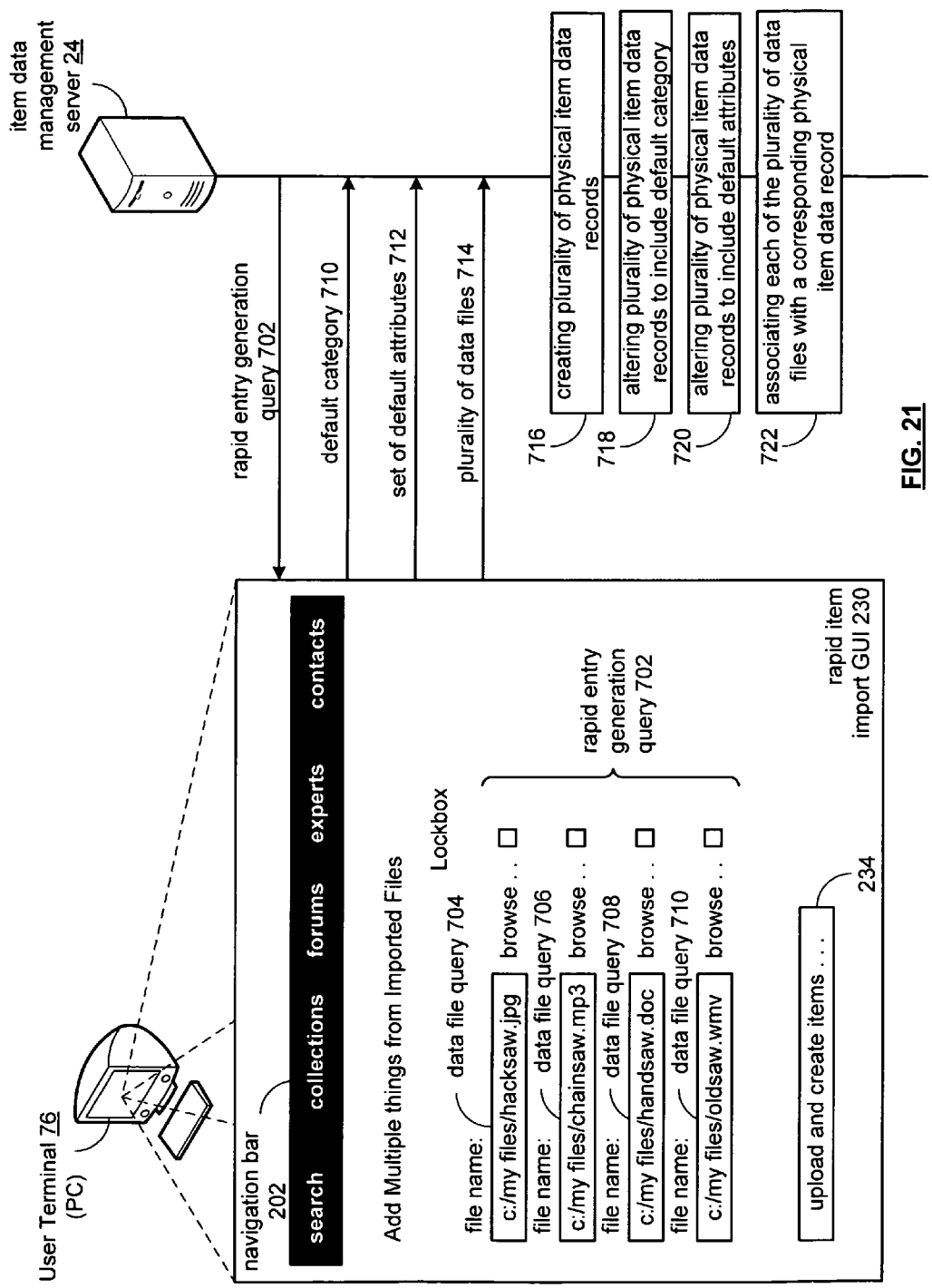
FIG. 21 is a signal flow diagram for creating a plurality of physical item data records with the item data management server via a rapid item import graphic user interface according to an embodiment of the invention.

FIG. 21 is a signal flow diagram for creating a plurality of physical item data records with the item data management server 24 via a rapid item import GUI 230. In general, the rapid item import GUI 230 facilitates rapid entry of physical items into the item data management server 24.

The item data management server 24 presents a rapid entry generation query 702 to the user terminal 76. The rapid entry generation query 702 includes data file queries 704, 706, 708, and 710. The rapid item import GUI 230 may include additional data file queries may be used to facilitate a larger number of data entries for physical items. The data file queries 704 through 710 receive file location responses from a user. The responses may be directly entered into the fields for the data file queries, or may be located using a directory browse feature to access the directory structure of the user terminal 76 or a distributed device associated with the user terminal 76. The filename and directory path are entered into the data file queries 704 through 710. Upon pressing the upload and create items command 234, the item data management server 24 receives and creates physical item data records 240 for the physical items identified from the uploaded files.

Through the rapid entry generation query 702, the rapid item import GUI 230 may receive locations of media files such as photo media files, digital recording files, text files, and/or multimedia files. For example, the data file query 704 includes a file location with photo media file extension ".jpg," the data file query 706 includes a file location with the digital recording file extension ".mp3," the data file query 708 includes a file location with the text file extension ".doc," and the data file query 710 includes a file location with the multimedia file extension "wmv." It should be noted that various file formats may have a combination of media types. For example, a photo media file may include text regarding the time and date an image was created along with a brief text or audio description in addition to the photo image. File formats are discussed in detail with reference to FIG. 22.

When the user presses the upload and create items command 234 in response to the rapid entry generation query 702, the item data management server 24 receives a default category 710 and a set of default attributes 712 that correspond to all of the plurality of physical items in the control of the user. In this manner, the item data management server 24 provides a level of automation to the creation of physical item data records without a call for user input for each record. If the user desires, the category and set of attributes for a physical item may be later updated or modified as desired. The item data management server 24 also receives, in response to the rapid entry generation query 702, a plurality of data files 714, where each data file is respective to one of the plurality of physical items in the control of the user.

The item data management server 24, at 716, creates the plurality of physical item data records and alters each of the physical item data records to include the default category at 718, and to include the set of default attributes at 720. The item data management server 24, at 722, associates each of the plurality of data files with a corresponding physical item data record. Accordingly, the item data management server 24 creates a plurality of physical item data records based upon the plurality of data files identified by a user through the rapid item import GUI 230.

Figure 22:
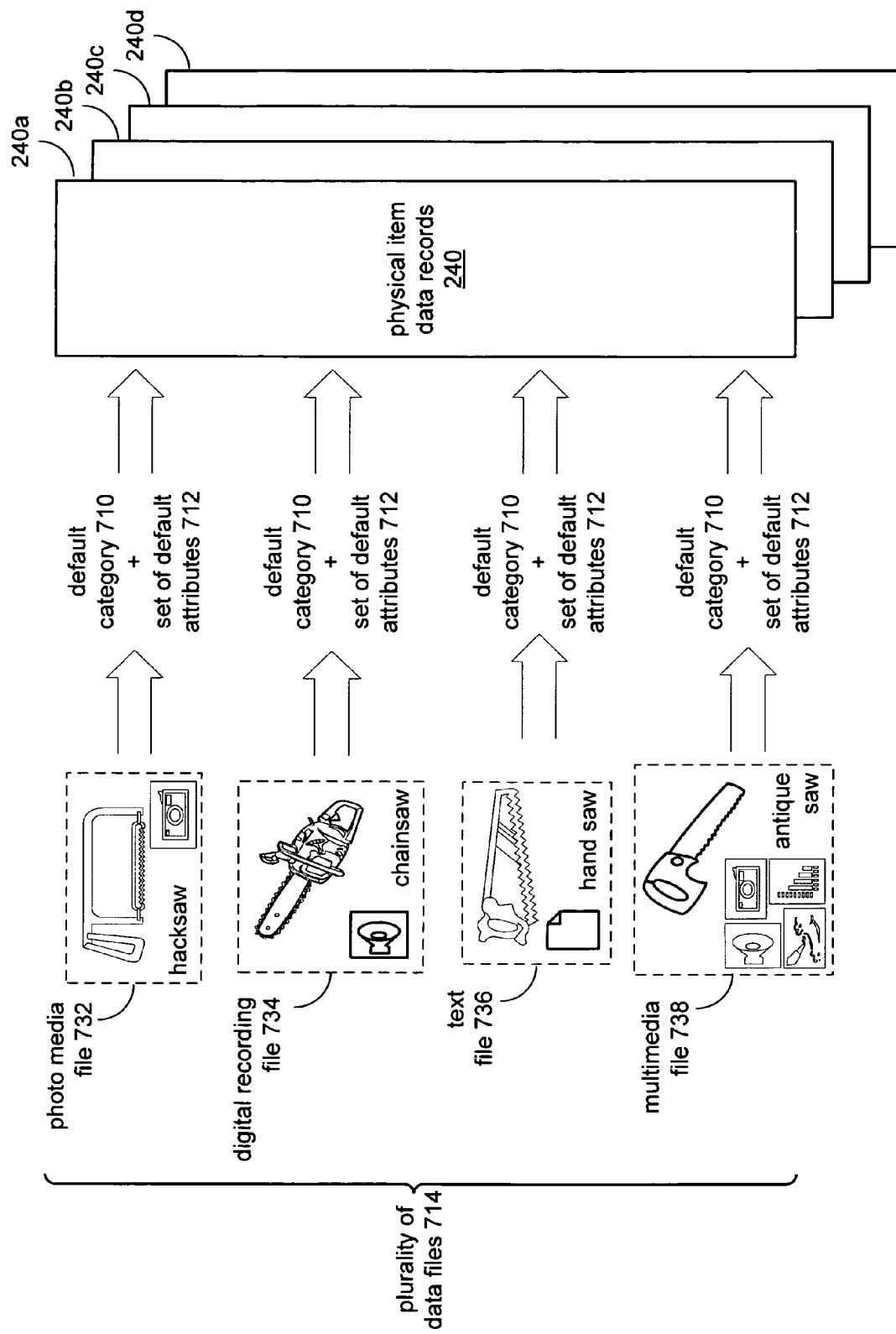
FIG. 22 illustrates a plurality of data files that the item data management server associates with the physical item data records according to an embodiment of the invention.

FIG. 22 illustrates the plurality of data files 714 the item data management server 24 associates with the physical item data records. In this example, the item data management server 24 receives responses to the rapid entry generation query 702 relating to saws in the control of the user.

The plurality of data files 714 include a photo media file 732 with a digital image of a hacksaw, a digital recording file 734 with an audio description (such as the physical item's make, model, serial number, purchase price, et cetera) and/or audio recording of a chainsaw, a text file 736 that includes a written description of a hand saw, and a multimedia file 738 that includes multimedia entries (such as a digital image, audio, text, et cetera) for an antique saw. For purposes of discussion, the file types are indicated generally through icons (such as a camera for photo media, a speaker for digital recording media, a paper for text media, and a combination of various icons for multimedia). The specific file types are indicated with the filename extensions, such as, for photo media extensions including "jpg," "tiff," et cetera, for digital recording media extensions such as "mp3," "wav," et cetera, for text media extensions such as "doc," "txt," et cetera, and for multimedia extensions such as "wmv," et cetera. It should be noted that the files may also have some or all combinations of digital media including digital image, audio, and/or text. For example, the photo media file 732 may include text information such as time and date the image was created, as well as a brief description.

The item data management server 24 creates the physical item data records 240a, 240b, 240c, and 240d, and alters each of the plurality of physical item data records to include the default category 710 and set of default attributes 712. The item data management server 24 associates each of the plurality of data files 714 with a corresponding physical item data record. For example, the item data management server 24 associates the photo media file 732 with the physical item data record 240a, the digital recording file 734 with the physical item data record 240b, the text file 736 with the physical item data record 240c, and the multimedia file 738 with the physical item data record 240d.

Figure 23:
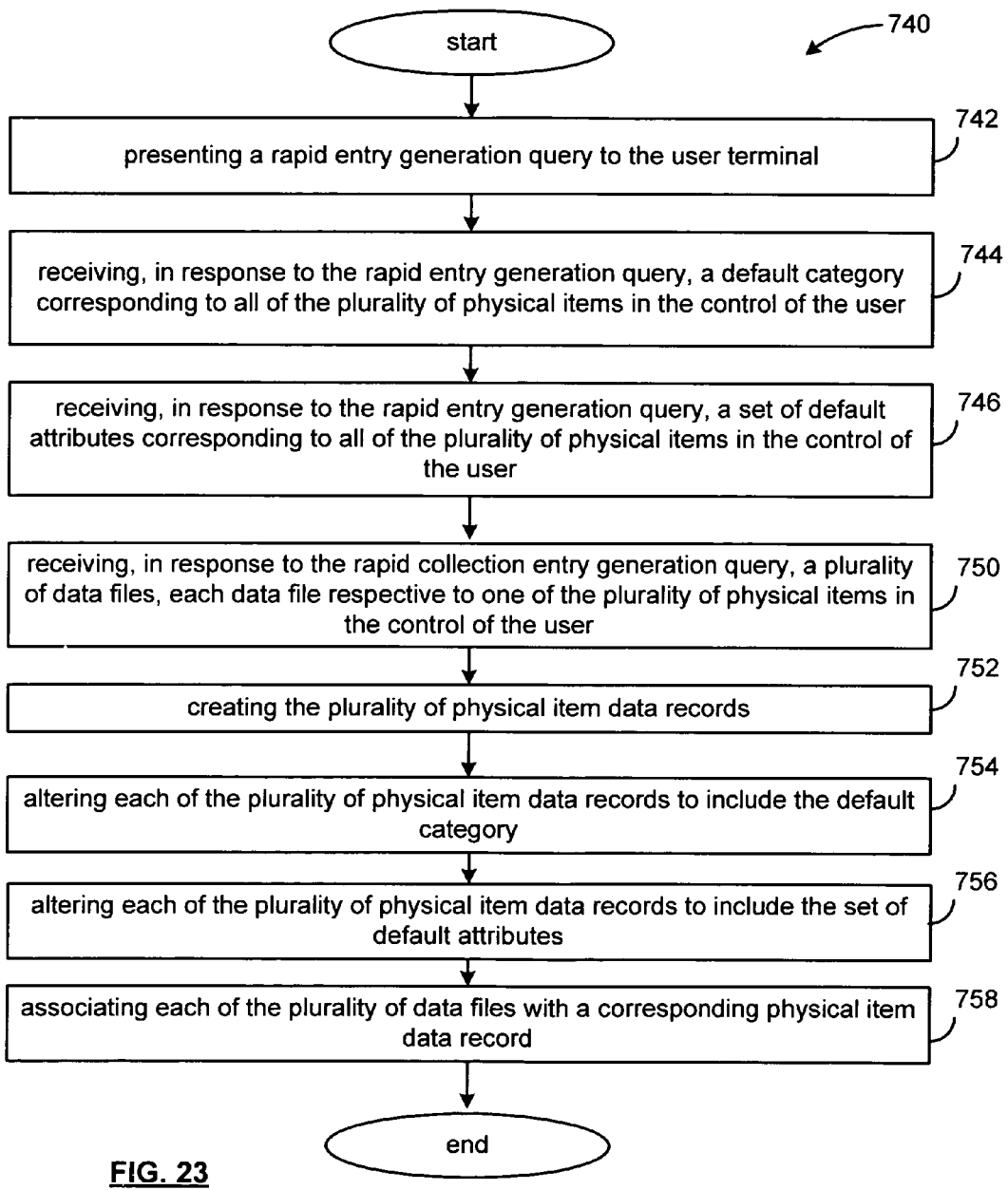
FIG. 23 is a flow diagram illustrating a method in an item data management server to create a plurality of physical item data records corresponding to a plurality of physical items in the control of a user according to an embodiment of the invention.

FIG. 23 is a flow diagram illustrating a method 740 in an item data management server to create a plurality of physical item data records corresponding to a plurality of physical items in the control of a user.

Beginning at step 742, the item data management server presents a rapid entry generation query to the user terminal. The rapid entry generation query may be presented in a GUI with fields to receive a response from a user. At step 744, the item data management server receives, in response to the rapid collection entry generation query, a default category corresponding to all of the plurality of physical items in the control of the user. At step 746, the item data management server receives, in response to the rapid entry generation query, a set of default attributes corresponding to all of the plurality of physical items in the control of the user. In this manner, the creation of physical item data record population is automated with default category and attribute values, which a user may revisit to change, modify or otherwise update. And at step 750, the item data management server 24 receives, in response to the rapid collection entry generation query, a plurality of data files. Each data file is respective to one of a plurality of physical items in the control of the user.

The item data management server creates the plurality of physical item data records, in which the item data management server alters each of the plurality of physical item data records to include the default category at step 754, and alters each of the plurality of physical item data records to include the set of default attributes at step 756. The item data management server associates each of the plurality of data files with a corresponding physical item data record at step 758.

Figure 24:
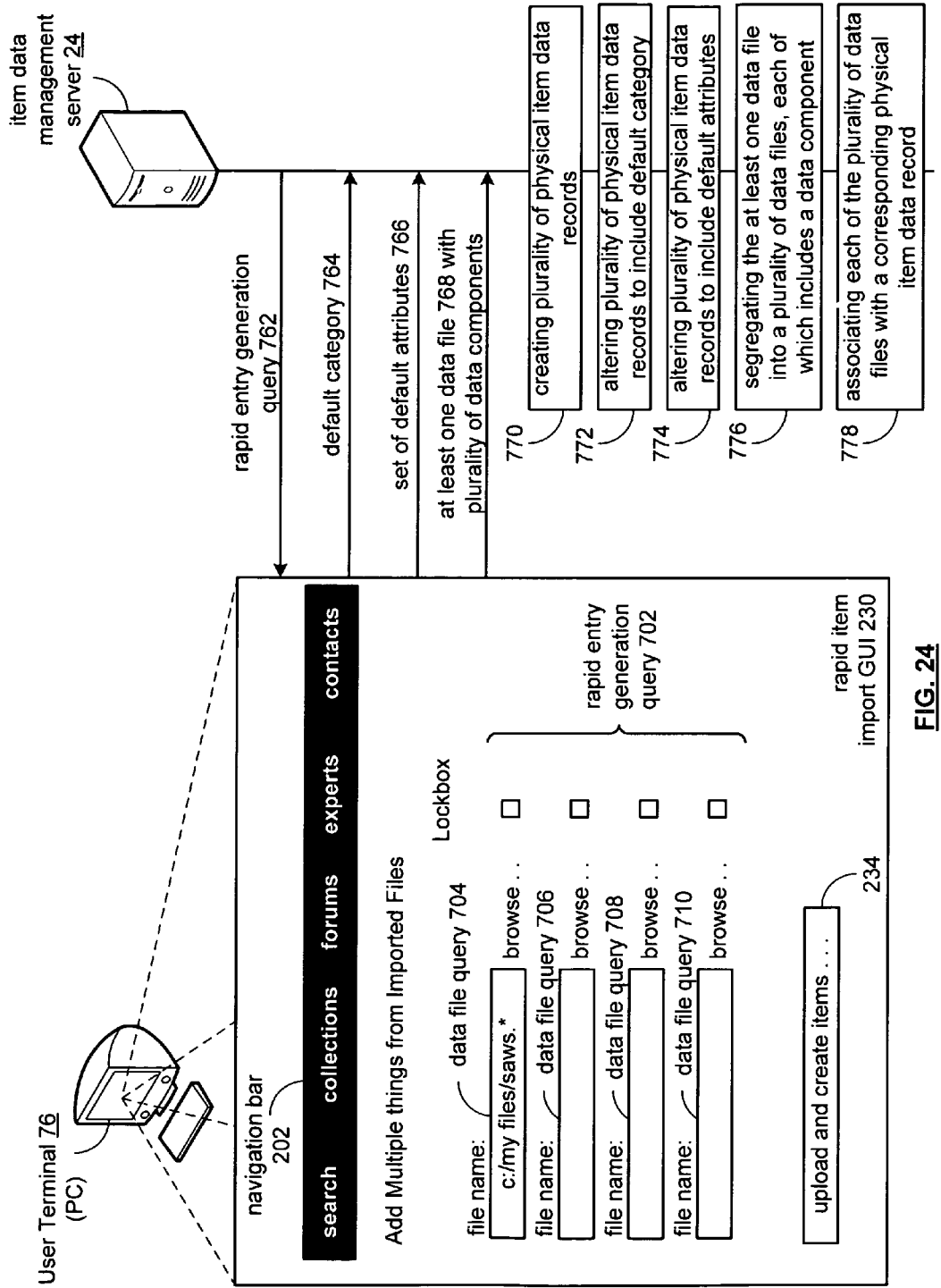
FIG. 24 is another signal flow diagram relating to creating a plurality of physical item data records with the item data management server via a rapid item import graphic user interface according to an embodiment of the invention.

FIG. 24 is another signal flow diagram relating to creating a plurality of physical item data records with the item data management server 24 via a rapid item import GUI 230. In general, the rapid item import GUI 230 facilitates rapid entry of physical items into the item data management server via a data file that includes a plurality of data components, where each of the data components are in the control of user.

The item data management server 24 presents a rapid entry generation query 762 to the user terminal 76. The rapid entry generation query 762 includes data file queries 704, 706, 708, and 710. The data file queries 704 through 710 receive file location responses from a user, that may be directly entered into the fields for the data file queries, or may be located using a directory browse feature to access the directory structure of the user terminal 76 or a distributed device associated with the user terminal 76. The filename and directory path are entered into the data file queries, and upon pressing the upload and create items command 234, the item data management server 24 receives and creates physical item data records 240 (see FIG. 7) for the physical items identified from the uploaded file and/or files.

Through the rapid entry generation query 702, the rapid item import GUI 230 may receive locations for inventory files and/or media files, where each of the files contain multiple entries (such as an inventory file) or components (such as a media file) that may be parsed into individual physical item entries. The inventory files may have been created by other applications, but may be imported with file conversion utilities into the database 78. That is, though pre-existing files may have file formats that differ from the database 78 (see FIG. 2), the item data management server 24 may convert the file to a compatible format to create a plurality of physical item data records corresponding to a plurality of physical items in the control of a user with the underlying data. For example, when receiving a plurality of inventory-based data files, the item data management server 24 uses a conversion utility to convert data from other file formats (such as Excel, TurboTax, Quickbooks, Quicken, et cetera) to populate a plurality of physical item data records of the database 78.

The rapid entry generation query 702 may also accept media file locations for photo media files, digital recording files, text files, and/or multimedia files. For example, the data file query 704 includes a file location for a file that includes a plurality of data components respective to the plurality of physical items in the control of the user. In this example, the data file location is "c:/my files/saws.*," where the wildcard symbol "*" indicates that the file extension may be a various file formats, such as a photo media file format, a digital recording file format, a text file format, and/or a multimedia file format. Examples of the various file formats are discussed in detail with reference to FIGS. 25 through 27.

In operation, when the item data management server 24 receives a data file with a plurality of data components, a parsing utility to automatically (or with user input) parses the data components from the file. In general, parsing serves to beak the data file 768 into smaller, more distinct components that can be more easily acted upon by the user. The parsing utility serves to reduce the time required by a user to enter their physical items into physical item data records. For example, entering all the hardware tools, jewelry, collection items, et cetera, in the control of user on an item-by-item basis may be a multi-day task, which the parsing utility can aid in reducing to a matter of hours.

The files that the item data management server 24 produces from the parsed data components can then be selected by the user for inclusion in the database 78 of the item data management server 24. When the user does not select a parsed data component for inclusion in the item data management server 24, the parsed data component may be deleted, or the parsed data component may be stored as a work-in-progress for later completion (including selection for inclusion in the database 78) of the physical item data record. Further, the user may respond to a query to include the parsed data component in a pre-existing physical item data record.

When the user presses the upload and create items command 234, in response to the rapid entry generation query 702, the item data management server 24 receives a default category 764 and a set of default attributes 766, each of which correspond to all of the plurality of physical items in the control of the user. The item data management server 24 also receives, in response to the rapid entry generation query 702, at least one data file 768 that includes a plurality of data components respective to the plurality of physical items in the control of the user.

The item data management server 24, at 770, creates the plurality of physical item data records and alters each of the physical item data records to include the default category at 772, and to include the set of default attributes at 774. The item data management server 24, at 776, segregates the at least one data file into a plurality of data files, each of which includes a data component corresponding to a respective physical item in the control of the user. At 778, the item data management server 24 associates each of the plurality of data files with a corresponding physical item data record.

Figure 25:
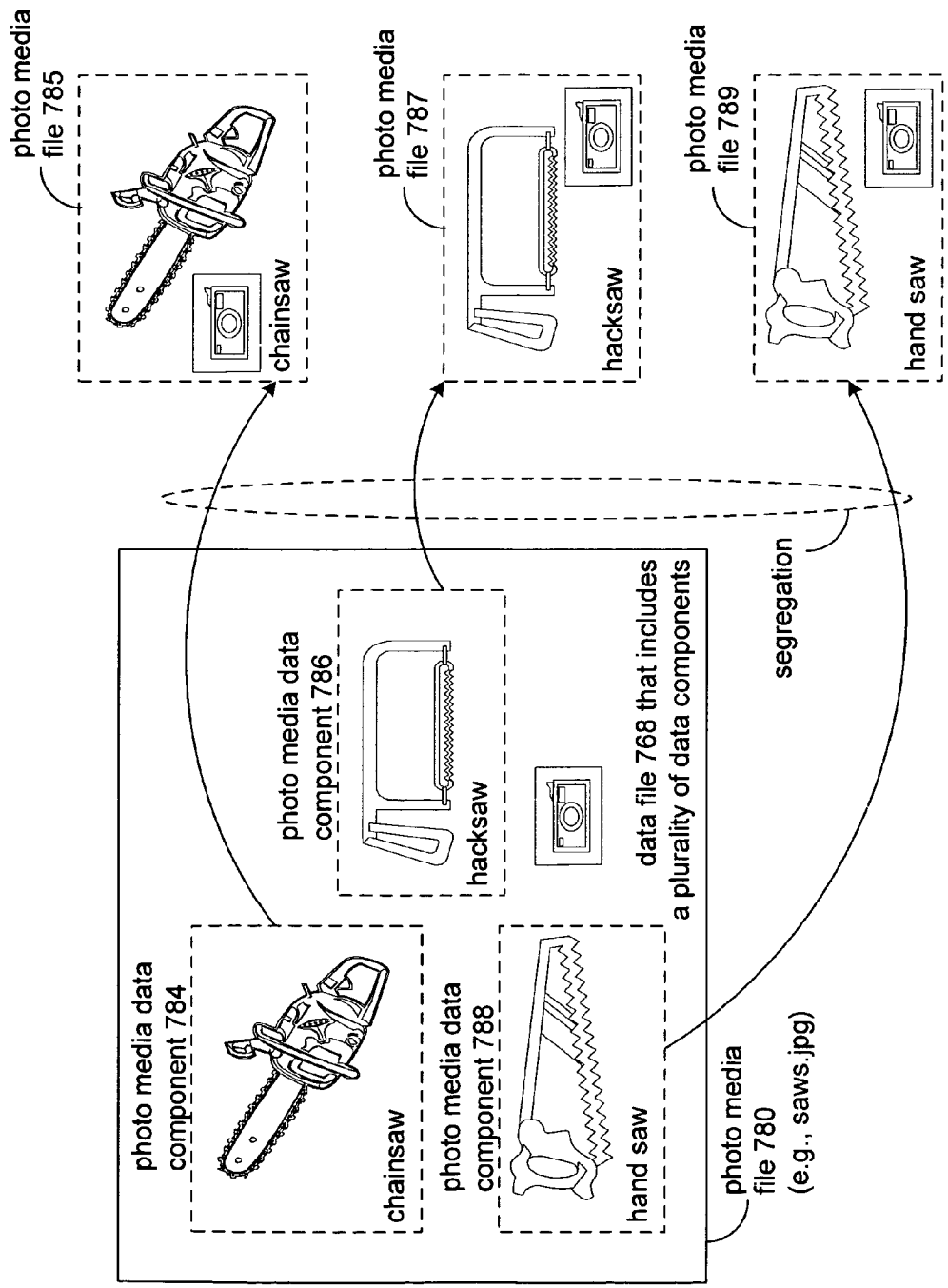
FIG. 25 illustrates a photo media file that includes a plurality of data components according to an embodiment of the invention.

FIG. 25 illustrates a photo media file 780 that includes a plurality of data components, which the item data management server 24 received in response to the rapid entry generation query 762. In the example, the photo media file 780 has a JPEG file format as indicated by the file name "saws.jpg." The photo media file 780 includes a photo media data component 784 for a chainsaw, a photo media data component 786 for a hacksaw, and a photo media data component 788 for a hand saw.

The item data management server 24 segregates the photo media file 780 into a plurality of data files, which include photo media file 785, photo media file 787, and photo media file 789. The server 24 segregates the photo media file 780 by parsing the components of the photo media file 780 into the plurality of photo media files 785 through 789, each of which corresponds to a respective physical item in the control of the user.

Figure 26:
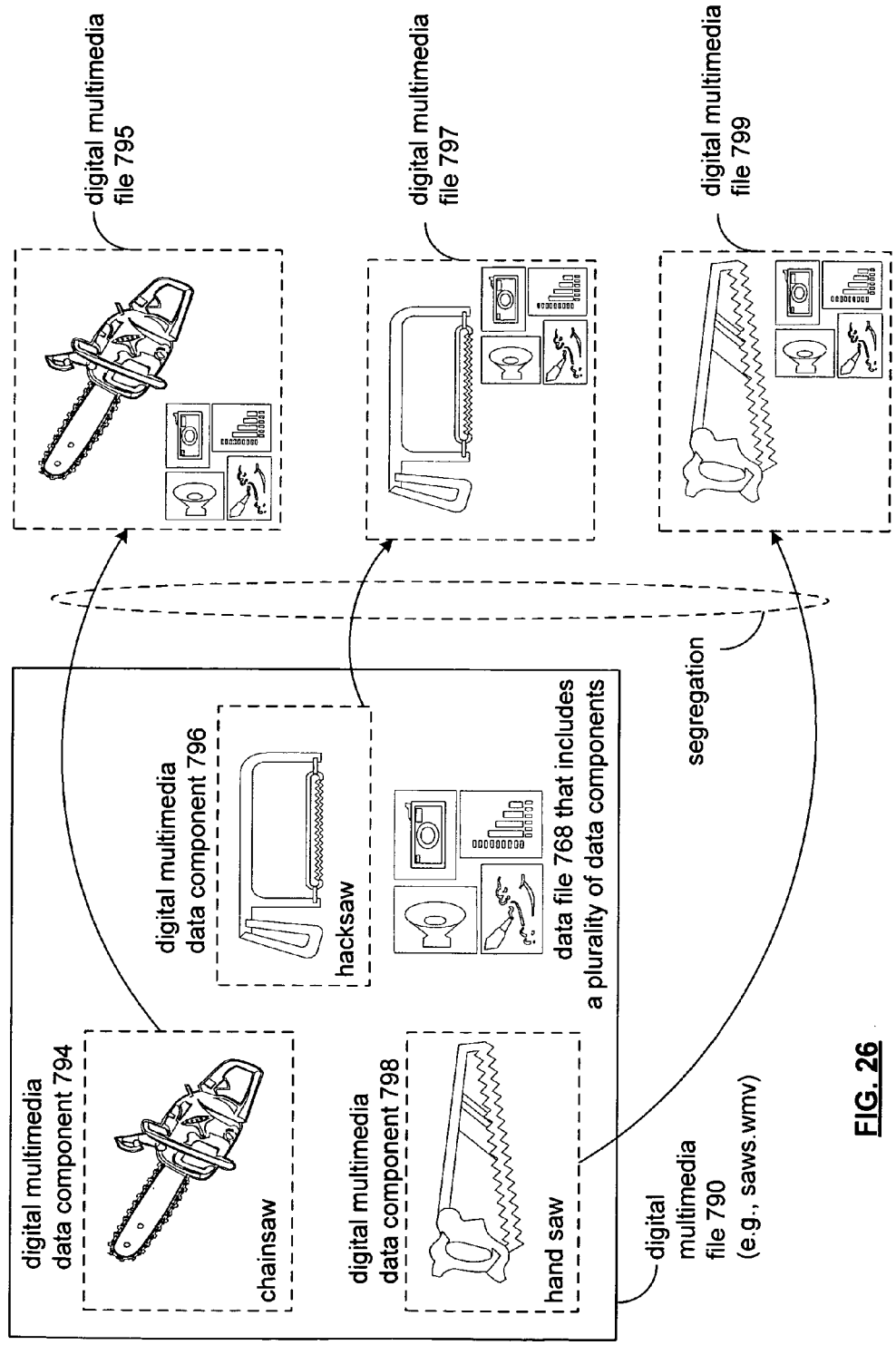
FIG. 26 illustrates a digital multimedia file that includes a plurality of data components, which the item data management server receives in response to a rapid entry generation query 762 according to an embodiment of the invention.

FIG. 26 illustrates a digital multimedia file 790 that includes a plurality of data components, which the item data management server 24 received in response to the rapid entry generation query 762. In the example, the digital multimedia file 790 has a Windows Media Video file format as indicated by the file name "saws.wmv." The digital multimedia file 790 includes a digital multimedia data component 794 for a chainsaw, a digital multimedia data component 796 for a hacksaw, and a digital multimedia data component 798 for a hand saw.

The item data management server 24 segregates the digital multimedia file 790 into a plurality of data files, which include digital multimedia file 795, digital multimedia file 797, and digital multimedia file 799. The server 24 segregates the digital multimedia file 790 by parsing the file components into the plurality of digital multimedia files 795 through 799, each of which corresponds to a respective physical item in the control of the user.

Figure 27:
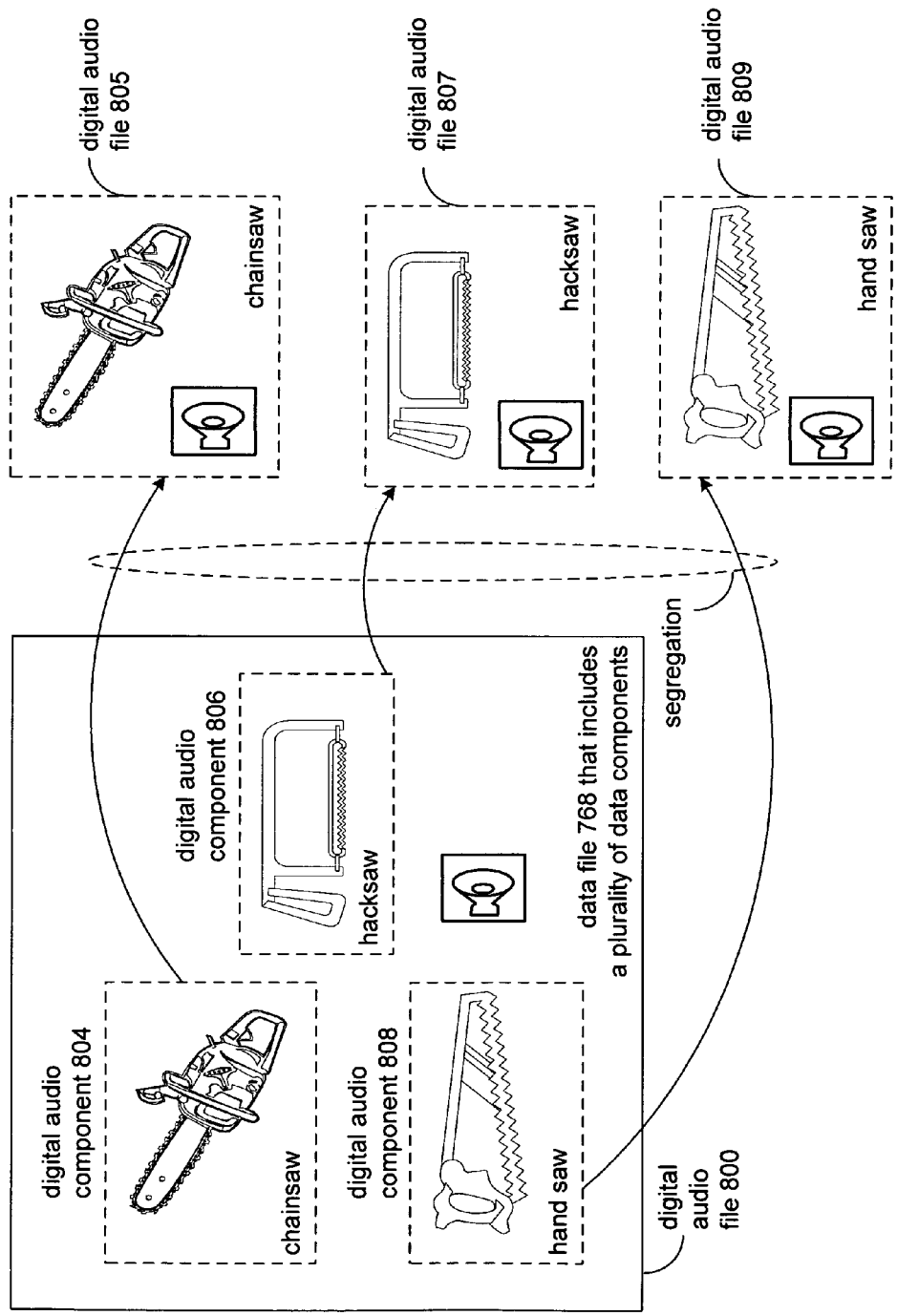
FIG. 27 illustrates a digital audio file 790 that includes a plurality of data components, which the item data management server receives in response to a rapid entry generation query according to an embodiment of the invention.

FIG. 27 illustrates a digital audio file 800 that includes a plurality of data components, which the item data management server 24 received in response to the rapid entry generation query 762. In the example, the digital audio file 800 has a MPEG-3 file format as indicated by the file name "saws.mp3." The digital audio file 800 includes a digital audio component 804 for a chainsaw, a digital audio component 806 for a hacksaw, and a digital audio component 808 for a hand saw.

The item data management server 24 segregates the digital audio file 800 into a plurality of data files, which include digital audio file 805, digital audio file 807, and digital audio file 809. The server 24 segregates the digital audio file 800 by parsing the components 804, 806, and 808 into the plurality of digital audio files 805 through 809, each of which corresponds to a respective physical item in the control of the user.

Figure 28:
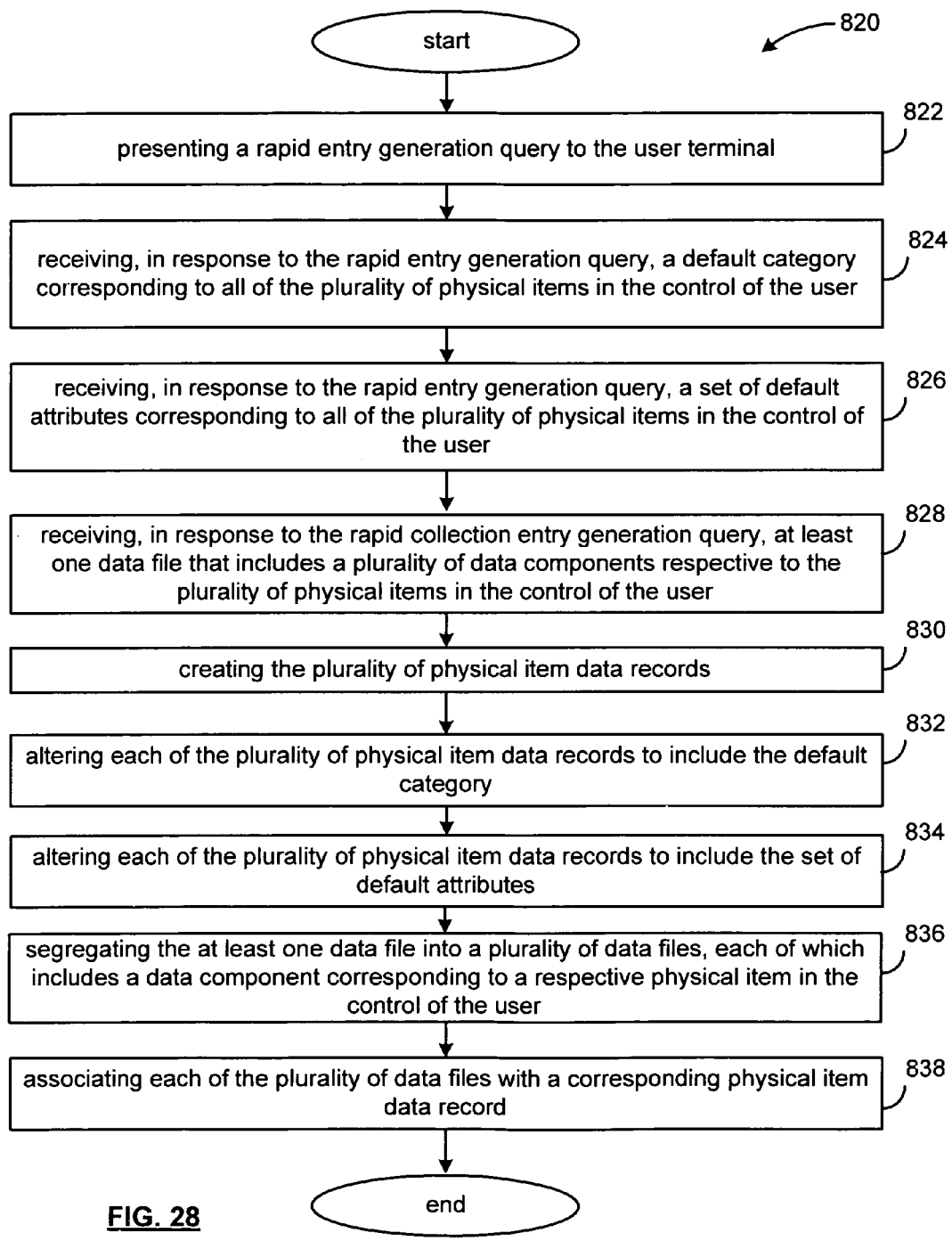
FIG. 28 is a flow diagram illustrating a further method in an item data management server to create a plurality of physical item data records corresponding to a plurality of physical items in the control of a user according to an embodiment of the invention.

FIG. 28 is a flow diagram illustrating a further method 820 in an item data management server to create a plurality of physical item data records corresponding to a plurality of physical items in the control of a user.

Beginning at step 822, the item data management server 24 presents a rapid entry generation query to a user terminal. The server 24 receives, in response to the rapid entry generation query, a default category corresponding to all of the plurality of physical items in the control of the user at step 824, a set of default attributes corresponding to all of the plurality of physical items in the control of the user at step 826, and at least one data file that includes a plurality of data components respective to the plurality of physical items in the control of the user at step 828.

At step 830, the item data management server 24 creates a plurality of physical item data records, and alters each of the plurality of physical item data records to include the default category at step 832, and to alter each of the plurality of physical item data records to include the set of default attributes at step 834.

The item data management server 24, at step 836, segregates the at least one data file into a plurality of data files, each of which includes a data component corresponding to a respective physical item in the control of the user. At step 838, the item data management server 24 associates each of the plurality of data files with a corresponding physical item data record.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

What is claimed is:

1. A method for operating an item data management server to create a plurality of physical item data records corresponding to a plurality of physical items in the control of a user, the item data management server communicatively coupled to a user terminal via at least one data network, the method comprising:
presenting a rapid entry generation query to the user terminal, wherein the rapid entry generation query includes a filename field for identifying a plurality of data files upon which to create the plurality of physical item data records;
receiving, in response to the rapid entry generation query,
a default category corresponding to all of the plurality of physical items in the control of the user;
a set of default attributes and user created attributes corresponding to all of the plurality of physical items in the control of the user; and
the plurality of data files identified in the filename field upon which to create the plurality of physical item data records, each data file respective to one of the plurality of physical items in the control of the user;
creating the plurality of physical item data records based upon the response to the rapid entry generation query;
altering each of the plurality of physical item data records to include the default category;
altering each of the plurality of physical item data records to include the set of default attributes;
associating each of the plurality of data files with a corresponding physical item data record;
creating a web page that includes information from the physical item data record; and at least one other link selected based upon the physical item data record; and
presenting, via the item data management server, the web page to the user terminal.

2. The method of claim 1 wherein each data file is a photo media file.

3. The method of claim 1 each data file is a digital recording file.

4. The method of claim 1 each data file is a text file.

5. The method of claim 1 each data file is a multimedia file.

6. An item data management server to create a plurality of physical item data records corresponding to a plurality of physical items in the control of a user, the item data management server communicatively coupled to a user terminal via at least one data network, the item data management server comprises:
processing circuitry;
a network interface operably coupled to the processing circuitry that supports data transmission with the at least one data network;
a user interface operably coupled to the processing circuitry; and
memory operably coupled to the processing circuitry, wherein the memory stores operational instructions that cause the processing circuitry to:
present a rapid entry generation query to the user terminal, wherein the rapid entry generation query includes a filename field for identifying a plurality of data files upon which to create the plurality of physical item data records;
receive, in response to the rapid entry generation query,
a default category corresponding to all of the plurality of physical items in the control of the user;
a set of default attributes corresponding to all of the plurality of physical items in the control of the user; and
the plurality of data files identified in the filename field upon which to create the plurality of physical item data records, each data file respective to one of the plurality of physical items in the control of the user;
create the plurality of physical item data records based upon the response to the rapid entry generation query;
alter each of the plurality of physical item data records to include the default category;
alter each of the plurality of physical item data records to include the set of default attributes;
associate each of the plurality of data files with a corresponding physical item data record;
create a web page that includes information from the physical item data record; and at least one other link selected based upon the physical item data record; and
present, via the item data management server, the web page to the user terminal.

7. The item data management server of claim 6 wherein each data file is a photo media file.

8. The item data management server of claim 6 each data file is a digital recording file.

9. The item data management server of claim 6 each data file is a text file.

10. The item data management server of claim 6 each data file is a multimedia file.

11. A method for operating an item data management server to create a plurality of physical item data records corresponding to a plurality of physical items in the control of a user, the item data management server communicatively coupled to a user terminal via at least one data network, the method comprising:

presenting a rapid entry generation query to the user terminal, wherein the rapid entry generation query includes a filename field for identifying at least one data file upon which to create the plurality of physical item data records;

receiving, in response to the rapid entry generation query,
a default category corresponding to all of the plurality of physical items in the control of the user;
a set of default attributes corresponding to all of the plurality of physical items in the control of the user; and
at least one data file that includes a plurality of data components respective to the plurality of physical items in the control of the user;

creating the plurality of physical item data records based upon the response to the rapid entry generation query;

altering each of the plurality of physical item data records to include the default category;

altering each of the plurality of physical item data records to include the set of default attributes;

segregating the at least one data file into a plurality of data files, each of which includes a data component corresponding to a respective physical item in the control of the user;

associating each of the plurality of data files with a corresponding physical item data record;

creating a web page that includes information from the physical item data record; and at least one other link selected based upon the physical item data record; and presenting, via the item data management server, the web page to the user terminal.

12. The method of claim 11, wherein the at least one data file comprises a digital audio file, and
wherein segregating the at least one data file into the plurality of data files comprises parsing the digital audio file into a plurality of digital audio files, each of which corresponds to a respective physical item in the control of the user.

13. The method of claim 11, wherein the at least one data file comprises a photo media file, and
wherein segregating the at least one data file into the plurality of data files comprises parsing the photo media file into a plurality of photo media files, each of which corresponds to a respective physical item in the control of the user.

14. The method of claim 11, wherein the at least one data file comprises a digital multimedia file, and
wherein segregating the at least one data file into the plurality of data files comprises parsing the digital multimedia file into a plurality of digital multimedia files, each of which corresponds to a respective physical item in the control of the user.

15. An item data management server to create a plurality of physical item data records corresponding to a plurality of physical items in the control of a user, the item data management server communicatively coupled to a user terminal via at least one data network, the item data management server comprises:
processing circuitry;
a network interface operably coupled to the processing circuitry that supports data transmission with the at least one data network;
a user interface operably coupled to the processing circuitry; and
memory operably coupled to the processing circuitry, wherein the memory stores operational instructions that cause the processing circuitry to:
present a rapid entry generation query to the user terminal, wherein the rapid entry generation query includes a filename field for identifying at least one data file upon which to create the plurality of physical item data records;
receive, in response to the rapid entry generation query,
a default category corresponding to all of the plurality of physical items in the control of the user;
a set of default attributes corresponding to all of the plurality of physical items in the control of the user; and
at least one data file that includes a plurality of data components respective to the plurality of physical items in the control of the user;
create the plurality of physical item data records based upon the response to the rapid entry generation query;
alter each of the plurality of physical item data records to include the default category;
alter each of the plurality of physical item data records to include the set of default attributes;
segregate the at least one data file into a plurality of data files, each of which includes a data component corresponding to a respective physical item in the control of the user;
associate each of the plurality of data files with a corresponding physical item data record;
create a web page that includes information from the physical item data record; and at least one other link selected based upon the physical item data record; and
present, via the item data management server, the web page to the user terminal.

16. The item data management server of claim 15, wherein the at least one data file comprises a digital audio file, and
wherein the memory further stores operational instructions that cause the processing circuitry to segregate the at least one data file into the plurality of data files by:
parsing the digital audio file into a plurality of digital audio files, each of which corresponds to a respective physical item in the control of the user.

17. The item data management server of claim 15, wherein the at least one data file comprises a photo media file, and
wherein the memory further stores operational instructions that cause the processing circuitry to segregate the at least one data file into the plurality of data files by:
parsing the photo media file into a plurality of photo media files, each of which corresponds to a respective physical item in the control of the user.

18. The item data management server of claim 15, wherein the at least one data file comprises a digital multimedia file, and
wherein the memory further stores operational instructions that cause the processing circuitry to segregate the at least one data file into the plurality of data files by:
parsing the digital multimedia file into a plurality of digital multimedia files, each of which corresponds to a respective physical item in the control of the user.

* * * * *